(12) United States Patent
Fitzsimmons, Jr.

(10) Patent No.: US 7,358,959 B2
(45) Date of Patent: Apr. 15, 2008

(54) METHODS AND SYSTEMS FOR OPERATING A DISPLAY FACILITY OR OTHER PUBLIC SPACE

(75) Inventor: Robert L. Fitzsimmons, Jr., Seattle, WA (US)

(73) Assignee: Vulcan, Inc., Seattle, WA (US)

( * ) Notice: Subject to any disclaimer, the term of this patent is extended or adjusted under 35 U.S.C. 154(b) by 1092 days.

(21) Appl. No.: 09/881,216

(22) Filed: Jun. 15, 2001

(65) Prior Publication Data

US 2002/0068991 A1 Jun. 6, 2002

Related U.S. Application Data

(63) Continuation-in-part of application No. 09/594,697, filed on Jun. 16, 2000, now abandoned.

(51) Int. Cl.
*G09G 5/00* (2006.01)
*G08B 5/22* (2006.01)

(52) U.S. Cl. ............... 345/169; 340/825.49; 705/14

(58) Field of Classification Search ............. None
See application file for complete search history.

(56) References Cited

U.S. PATENT DOCUMENTS

| | | | |
|---|---|---|---|
| 3,598,923 A | 8/1971 | Turner et al. | |
| 3,688,052 A | 8/1972 | Self et al. | |
| 3,934,202 A | 1/1976 | Missale | |
| 3,960,254 A | 6/1976 | Fial et al. | |
| 4,045,741 A | 8/1977 | Missale | |
| 4,163,123 A | 7/1979 | Brodsky et al. | |
| 4,457,019 A | 6/1984 | Szabo, Jr. et al. | |
| 4,824,375 A | 4/1989 | Weiner | |
| 4,982,072 A * | 1/1991 | Takigami | 235/384 |
| 5,020,155 A | 5/1991 | Griffin et al. | |
| 5,144,294 A | 9/1992 | Alonzi et al. | |

(Continued)

FOREIGN PATENT DOCUMENTS

WO WO 00/67155 11/2000

OTHER PUBLICATIONS

Covington, Richard, "A Swoopy, Funky, Fun House of Rock", (Jun. 2000), *Smithsonian Magazine*, 68-78.

*Primary Examiner*—Richard Hjerpe
*Assistant Examiner*—M. Fatahiyar
(74) *Attorney, Agent, or Firm*—Cooley Godward Kronish LLP

(57) ABSTRACT

Audio, video, text and image presentation systems allow visitors to display facilities and other public spaces to proactively select detailed information about the various items located within such facilities and spaces. Exemplary embodiments can be used in a museum exhibition to convey detailed information relating to museum artifacts. Alternatively, embodiments can be used in a convention center or retail environment to deliver information relating to products or services. Advantageously, information content delivered to the user includes high-quality audio, video and static images and, through a combination of selection functionality and bookmarking functionality, exemplary systems provide a link between the public space elements (e.g., artifacts, products, services, etc.) and additional, still more detailed information delivered off-line via another medium such as the World Wide Web (WWW) or a fixed workstation environment within the public space. Consequently, a visitor can self-guide and self-tailor his or her exploration of a display facility or other public space and/or extend his or her experience beyond the physical boundaries of the display facility or other public space.

17 Claims, 16 Drawing Sheets

U.S. PATENT DOCUMENTS

| | | |
|---|---|---|
| 5,152,003 A | 9/1992 | Poch |
| 5,333,257 A | 7/1994 | Merrill et al. |
| 5,461,371 A | 10/1995 | Matsumoto |
| 5,539,665 A * | 7/1996 | Lamming et al. ........... 709/224 |
| 5,566,327 A | 10/1996 | Sehr |
| 5,732,326 A | 3/1998 | Maruyama et al. |
| 5,796,351 A | 8/1998 | Yabuki |
| 5,797,125 A | 8/1998 | Hirohama |
| 5,850,610 A | 12/1998 | Testani et al. |
| 5,852,506 A | 12/1998 | Testani et al. |
| 5,870,683 A | 2/1999 | Wells et al. |
| 5,896,215 A | 4/1999 | Cecil et al. |
| 6,009,410 A * | 12/1999 | LeMole et al. ............... 705/14 |
| 6,085,976 A | 7/2000 | Sehr |
| 6,123,259 A | 9/2000 | Ogasawara |
| 6,169,498 B1 * | 1/2001 | King et al. ............... 340/686.1 |
| 6,195,022 B1 * | 2/2001 | Yamakita .................... 340/988 |
| 6,317,045 B1 * | 11/2001 | Suzuki ....................... 340/571 |
| 6,328,210 B1 * | 12/2001 | Kim et al. ................... 235/384 |
| RE37,531 E * | 1/2002 | Chaco et al. ................. 379/38 |
| 6,645,068 B1 * | 11/2003 | Kelly et al. .................... 463/9 |
| 6,879,835 B2 * | 4/2005 | Greene et al. ........... 455/456.1 |
| 6,973,438 B1 * | 12/2005 | Philyaw ....................... 705/26 |
| 7,010,497 B1 * | 3/2006 | Nyhan et al. ................. 705/14 |
| 2002/0028002 A1 * | 3/2002 | Whited ....................... 382/110 |
| 2002/0164977 A1 * | 11/2002 | Link, II et al. ............. 455/141 |

\* cited by examiner

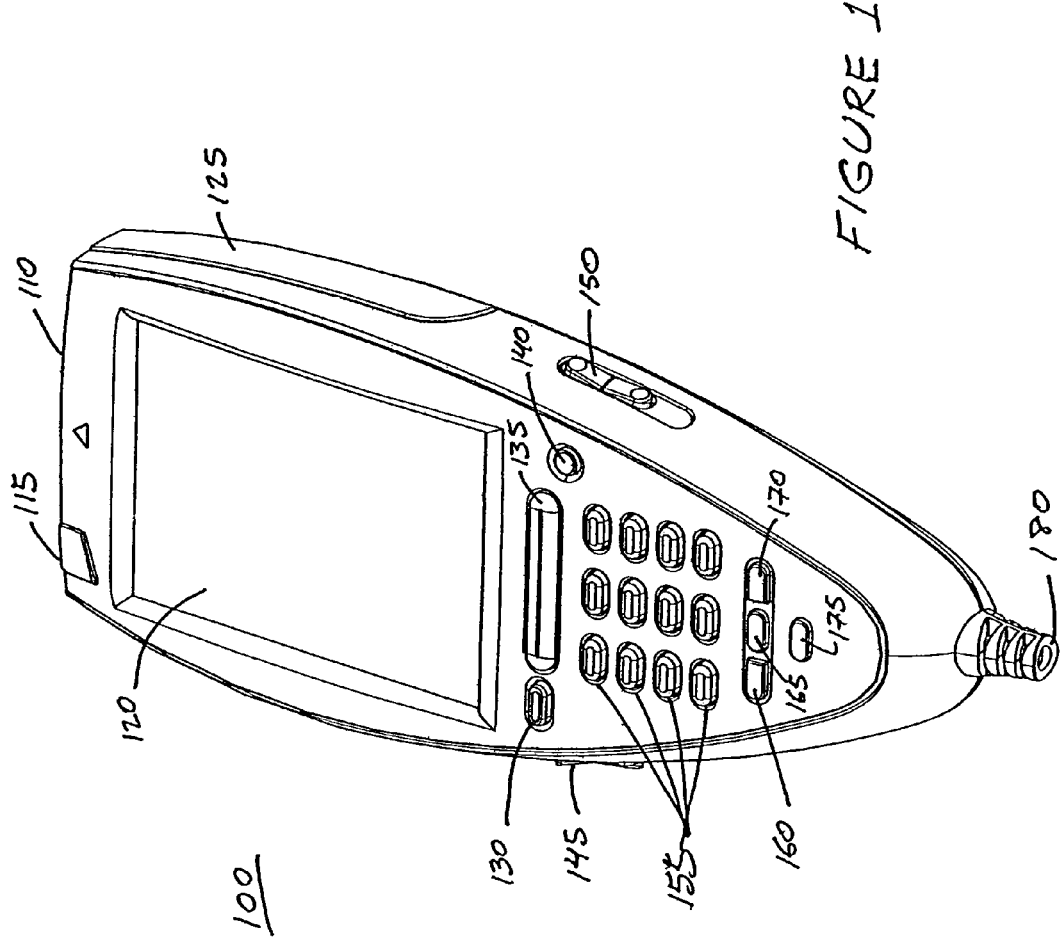

METHODS AND SYSTEMS FOR OPERATING A DISPLAY FACILITY OR OTHER PUBLIC SPACE

CROSS REFERENCES TO RELATED APPLICATIONS

The present application is a continuation-in-part of U.S. patent application Ser. No. 09/594,697, entitled "Methods and Apparatus for Supplementing the Experience of a Visitor to a Display Facility or Other Public Space" and filed Jun. 16, 2000, now abandoned which is incorporated herein in its entirety by reference.

BACKGROUND

1. Field of the Invention

The present invention relates to display facilities and other public spaces and, more particularly, to techniques for enhancing a visitor's experience within such a facility or space, and extending a visitor's experience beyond the physical constraints of such a facility or space.

2. Discussion of the Related Art

Traditionally, display facilities and other public spaces (e.g., museums, convention centers, retail stores, etc.) are constructed such that patrons passively view static objects and/or live or prerecorded presentations available in the facility or space (e.g., paintings and other artifacts, consumer electronics and other merchandise, live skits or audio I video and computer-generated demonstrations, etc.). More recently, however, display facilities and other public spaces have been equipped with technology intended to enrich the visitor experience and to provide more user control over the experience. For example, some museums now provide visitors with portable devices that enable those visitors to listen to accompanying audio when viewing artifacts. Additionally, some display facilities equip exhibits (e.g., with pushbuttons) so that visitors are able to select among a number of available audio or video presentations. However, known techniques still provide for relatively little visitor control, and do not provide opportunity to extend the visitor experience beyond the physical boundaries of the public spaces themselves. Consequently, there is a need for improved methods and apparatus for enriching the experience of a visitor to a display facility or other public space.

SUMMARY OF THE INVENTION

In an attempt to address these shortcomings of the known visitor experience, the present invention provides audio, video, text and image presentation systems that allow those who visit display facilities and other public spaces to proactively select detailed information about the various items located within such facilities and spaces. For example, exemplary embodiments can be used in a museum exhibition to convey detailed information relating to museum artifacts. Alternatively, embodiments can be used in a convention center or retail environment to deliver information relating to products or services. According to one embodiment, information content delivered to the user includes high-quality audio, video and static images. Also, through a combination of selection functionality and bookmarking functionality, exemplary systems provide a link between the public space elements (e.g., the artifacts, products, services, etc.) and additional, still more detailed information delivered off-line via another medium such as the World Wide Web (WWW) or a fixed workstation environment proximate the public space. Consequently, the invention enables a visitor to self-guide and self-tailor his or her exploration of the display facility or other public space, and further enables the visitor to extend his or her experience beyond the physical boundaries of the display facility or other public space.

The experience of a visitor to a public space having a plurality of artifacts can be supplemented utilizing a unique identifier with each of the plurality of artifacts. For example, as the visitor traverses the public space, identifiers associated with those artifacts the visitor indicates as being of interest can be recorded. After the visitor has completed traversing the public space, the visitor can access additional information relating to the artifacts associated with the recorded identifiers. Recording can be done, for example, by providing the visitor a portable selection device, the portable selection device enabling the visitor to select and store identifiers associated with artifacts of interest. In exemplary embodiments, the recorded identifiers are downloaded from the portable device to a user profile database when the visitor has completed traversing the public space.

Advantageously, the additional information can be provided by making the recorded identifiers available via a WWW site tailored to further research relating to the artifacts associated with the recorded identifiers. Alternatively, the additional information can be provided by making the recorded identifiers available via a workstation in the public space, the workstation being tailored to identify public space content and/or provide further content relating to the artifacts associated with the recorded identifiers. Moreover, the step of providing the visitor additional information can include the step of making the recorded identifiers available to a public space point-of-sale server, the point-of-sale server being tailored to personalize the visitor's subsequent visits to the public space based on the recorded identifiers and/or to keep the visitor apprised of events relating to the artifacts associated with the recorded identifiers. Advantageously, the public space can, according to exemplary embodiments, be any type of public space, including a museum, a convention center, a retail store, a sporting arena, an open-air exhibit, etc.

These and other features and advantages of the invention are described hereinafter with reference to a number of exemplary embodiments depicted in the accompanying drawings. Those of skill in the art will appreciate that the exemplary embodiments are provided by way of illustration only, and that numerous equivalent embodiments are also contemplated herein.

BRIEF DESCRIPTION OF THE DRAWINGS

FIG. 1 depicts a portable user selection device according to an exemplary embodiment of the invention.

DETAILED DESCRIPTION

Figure 2A:
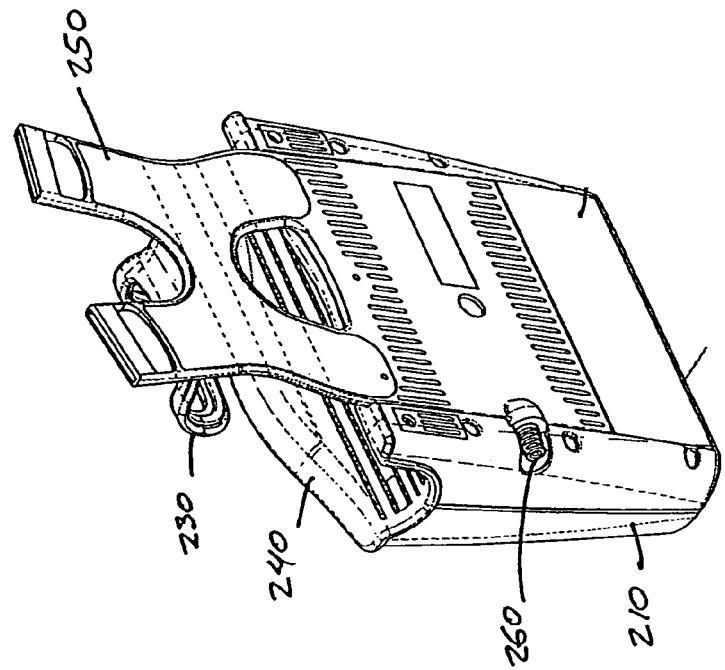
FIGS. 2A and 2B depict a portable content and control device according to an exemplary embodiment of the invention.

In one possible implementation of the invention, a visitor to a display facility or other public space is given a portable interface device that enables the user to select and listen to information related to artifacts displayed within the facility (hereinafter, the term facility is used generically to represent any known type of display facility or public space, including museums, convention exhibits, retail displays, sporting arenas, open-air exhibits, etc.; additionally, the term artifact is used generically to refer to any suitable display item, including static objects, video and computer displays, merchandise, etc.). Advantageously, the portable interface device serves as a facility-savvy companion and private tour guide to the facility visitor, providing the visitor an aesthetically pleasing, robust, and full-featured multimedia experience (effectively providing depth for the facility's breadth). Moreover, by recording visitor selections made within the facility, the portable interface device permits the visitor experience to be extended beyond the physical boundaries of the facility.

According to an exemplary embodiment, the portable interface device includes a content and control unit tethered, via a multi-wire cable, to a separate user selection device. Generally speaking, the content and control unit houses processing power and data content for the portable interface device, while the user selection device provides a user-friendly and interactive link between the portable interface device and the facility visitor.

FIG. 1 depicts an exemplary user selection device 100 according to one embodiment of the invention. As shown, the selection device 100 includes an outer casing 110, a bookmark key 115, a liquid crystal display (LCD) screen 120, and an indicator light 125. Additionally, the selection device 100 includes a Clear key 130, a Select key 135, a Help key 140, a Volume Control rocker switch 145, a Display Brightness Control rocker switch 150, a keypad including twelve numeric keys 155 arranged as on an ordinary telephone, a Review key 160, a Play/Pause key 165, a Forward key 170, a Stop key 175, and a connection port 180 (to accommodate the above noted tether to the content and control device). The exemplary user selection device 100 is a handheld device and, as is described in more detail hereinafter with respect to FIGS. 3 and 4, enables a visitor to access content corresponding to artifacts displayed within a suitably constructed facility.

Figure 2B:
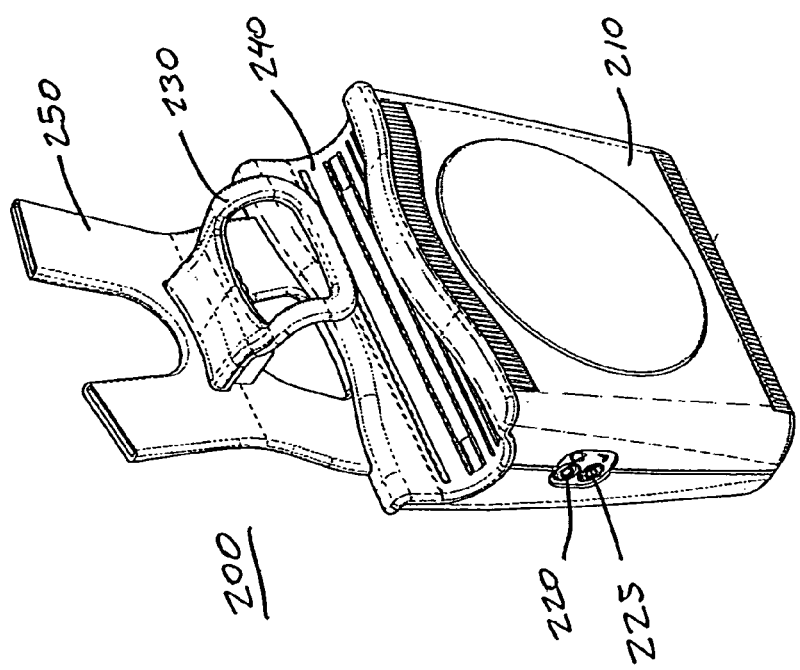

FIGS. 2A and 2B depict, respectively, front and rear perspective views of an exemplary content and control unit 200 according to one embodiment of the invention. As shown, the content and control unit 200 includes a main outer casing 210, an audio output port 220, an audio input port 225, a retaining arm 230, a cradle 240, a harness bracket 250, and a connection port 260 (to accommodate the multi-wire tether from the connection port 180 of the user selection device 100). The exemplary content and control unit 200 is worn on the visitor's person (e.g., via a shoulder strap or harness attached to the bracket 250), and the cradle 240 and the retaining arm 230 together provide a place for storing the user selection device 100 when not in use. As is described in more detail below with respect to FIGS. 3 and 4, the content and control device 200 controls operation of the user selection device 100 and provides selected content to the visitor (e.g., via a user headset plugged into the audio output port 220).

Figure 3:
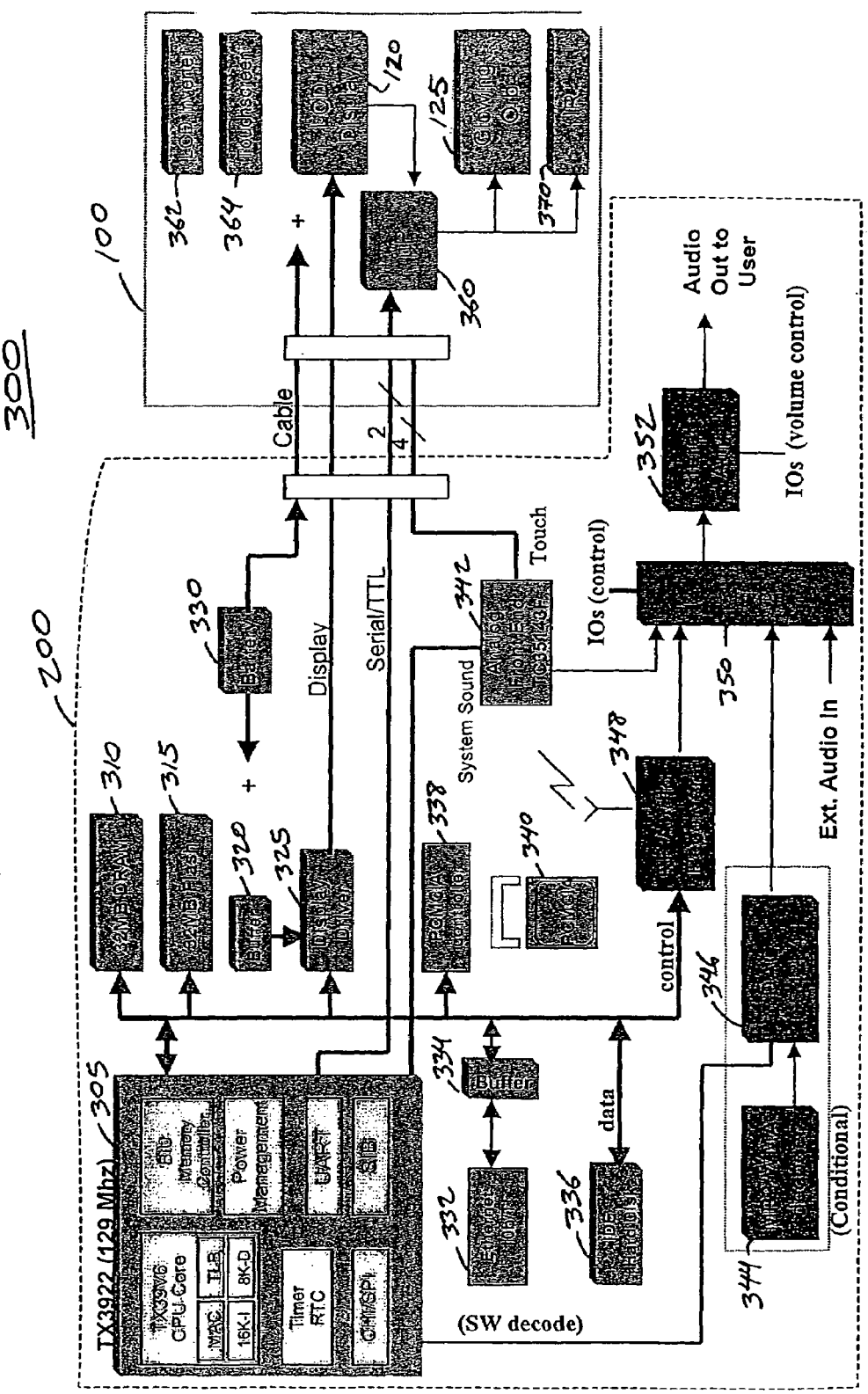
FIG. 3 is a block diagram of an exemplary portable display interface device, including an exemplary user selection device and an exemplary content and control device according to the invention.

FIG. 3 depicts components for one embodiment of an exemplary portable interface device 300 that includes the exemplary user selection device 100 of FIG. 1 and the exemplary content and control device 200 of FIG. 2. It will be appreciated that the component configuration of FIG. 3, as well as the physical configurations of FIGS. 1 and 2 are exemplary in nature. In practice, the user selection device 100 and the content and control device 200 can take on any suitable physical shape, and the exemplary components shown in FIG. 3 can be distributed between the devices 100, 200 in any suitable manner (e.g., the components of the separate devices 100, 200 can be combined into a single device if desired).

As shown, the exemplary content and control device 200 includes a main processor 305, a dynamic random access memory (DRAM) 310, a flash memory 315, a display buffer 320, a display driver 325, and a battery 330. Additionally, the exemplary content and control device 200 includes a network interface port 332, a communications buffer 334, an Integrated Drive Electronics (IDE) hard disk 336, a Personal Computer Memory Card International Association (PCM-CIA) controller 338, a PCMCIA card 340, an analog front end (AFE) controller 342, an audio decoder 344, a digital to analog converter 346, a radio frequency (RF) audio receiver 348, an analog audio mixer 350, and an analog stereo amplifier 352. As shown, the exemplary user selection device 100 includes a microprocessor 360, a touch screen 364, the LCD screen 120, the indicator light 125 (alternately referred to as a glowing orb), and an infrared (IR) receiver 370.

In operation, the main processor 305 (e.g., the well known Toshiba 129 MHz TX3922) provides information and menu options to the display facility visitor via the LCD 120, and receives input (e.g., menu selections, requests for help, control commands, etc.) from the visitor via the touch screen 364 (which can be integral with the LCD screen, and which communicates with the main processor 305 through the AFE 342) and/or via the various selection device input keys 115, 130, 135, 140, 155, 160, 165, 170, 175 (shown in FIG. 1, but not shown in FIG. 3). Additionally, the main processor 305 provides feedback to the user via the indicator light 125, and receives information from the display facility via the IR receiver 370 (as is described in greater detail below with respect to FIG. 4). Within the user selection device 100, the microprocessor 360 (e.g., the well known Dallas DS87C550 processor) provides an interface between the main processor 305 and various selection device components as shown.

In addition to providing the above described functionality, the main processor 305 records user input (e.g., key presses) on the IDE hard disk 336, and retrieves user selected content (e.g., compressed audio files) from the IDE hard disk 336 as the user traverses the display facility. Moreover, when the portable interface device 300 is not in use, the main processor 305 communicates with a server associated with the external display facility via the interface port 332 (e.g., an Ethernet 10b/T port located in the base of the content and control device 200) or via the PCMCIA controller 338 (e.g., where the PCMCIA card 340 is configured for wireless communication via an RF local area network, or LAN). Communications with the external server enable the main processor 305 to upload current content and/or application software and to download recorded information about visitor inputs. All of the above described functionality of the main processor 305 is made more clear hereinafter by way of the description of FIG. 4. In exemplary embodiments, the main processor 305 runs the well known Windows CE Version 2.x operating system, and application specific functionality is provided via software written in the well known Visual C++ language.

As is also shown in FIG. 3, the stereo amplifier 352 receives analog input from the analog mixer 350, and provides amplified audio output to the user (e.g., via a stereo headset plugged into the analog output 220, under control of the user via the Volume Control rocker switch 145). Advantageously, the mixer 350 can receive input from four different audio sources as appropriate. Specifically, the mixer 350 can receive: operating system sounds from the main processor 305 (via the AFE 342); audio content retrieved from the IDE hard disk 336 by the main processor 305 (and decompressed either by the main processor 305 itself, or by a separate audio decoder 344, depending upon design considerations); RF audio picked up by the RF receiver 348 from an external RF source (e.g., a display facility transmitter); and/or external audio received via the audio input port 225. Again, these aspects of the content and control device 200 are made more clear immediately hereinafter by way of the description of FIG. 4.

Figure 4:
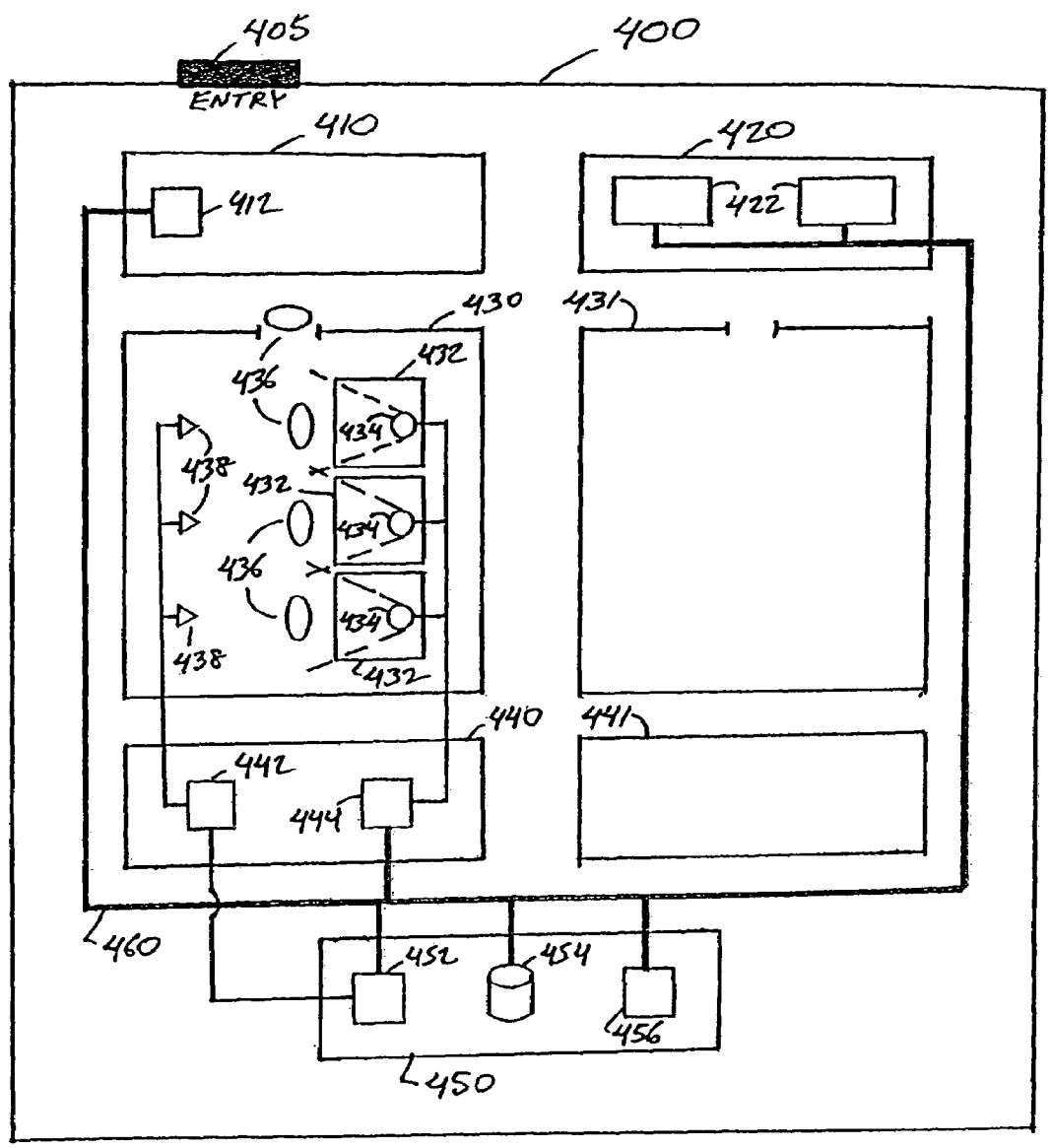
FIG. 4 is a block diagram of an exemplary display facility according to the invention.

FIG. 4 depicts an exemplary display facility 400 in which the exemplary interface device 300 of FIG. 3 can be used. As shown, the exemplary facility 400 includes an entry 405, a reception area 410, a device docking area 420, first and second galleries 430, 431, first and second auxiliary equipment centers 440, 441, and a main equipment center 450. The reception area 410 includes a point-of-sale (POS) server 412, and the device docking area 420 includes a number of device docking stations 422.

Additionally, the first gallery 430 includes a number of exhibit areas 432, a corresponding number of IR transmitters 434, a plurality of proximity loop transmitters 436, and a plurality of RF antennae 438. The first auxiliary equipment center 440 includes an RF audio transmitter 442 and an exhibit server 444. Although the second gallery 431 and the second auxiliary equipment center 441 are shown empty in FIG. 4, it will be understood that they include components analogous to those found in the first gallery 430 and the first auxiliary center 440, respectively.

The main equipment center 450 includes an audio/video (AV) server 452, a user profile database server 454, and a content server 456. Each of the servers 412, 444, 452, 454, 456, as well as each of the docking stations 422, is connected to a common communications network 460 (e.g., an Ethernet 10b/T network). Additionally, the AV server 452 is coupled to the RF audio transmitter 442, and the RF transmitter 442 is in turn coupled to each of the RF antennae 438. Finally, the exhibit server 444 is coupled to each of the IR transmitters 434.

Upon entering the facility 400, a visitor is directed to the reception area where, according to embodiments of the invention, he or she can obtain a ticket to view the artifacts displayed within the facility. The POS server (which can utilize any of several well known POS systems) provides a ticket having a unique identifier (e.g., a unique barcode number). In addition to the ticket, the visitor receives a portable interface device 300 such as that described above with respect to FIGS. 1-3. As the portable interface device 300 is given, or checked out, to the user, the unique ticket number is uploaded to the portable interface device 300 and stored on the internal hard disk 336 within the content and control device 200. For example, the user selection device 100 can include a bar code scanner (not shown in FIGS. 1 and 3) which can be swiped across the ticket to automatically read the unique barcode imprinted thereon.

Upon receiving the portable interface device 300, the visitor is free to traverse the visitor-accessible portions of the facility (e.g., the galleries 430, 431). In the exemplary facility 400 of FIG. 4, it is presumed that artifacts are grouped within exhibits 432, and that exhibits 432 are in turn grouped within galleries 430, 431. Note, however, that these groupings are arbitrary and, in practice, the facility artifacts can be partitioned in any suitable manner.

In the embodiment of FIG. 4, proximity detectors 436 (e.g., RF loop transmitters embedded within the facility floor as is well known in the art) are used to inform the portable interface device 300, via the internal RF receiver 348, that the visitor has entered a specific gallery 430, 431, and/or has approached a specific exhibit 432. Additionally, the proximity detection can be used to tune the internal RF receiver 348 to appropriate RF channels being broadcast over the RF antennae 438 (the antennae 438 being driven by the RF transmitter 442, which is in turn driven by the AV server 452). Thus, once the portable interface device 300 identifies the gallery and exhibit, the portable interface device can, for example, provide the visitor with context sensitive menu selections, help functions, introductory audio clips, a list of artifact clips and/or other information corresponding to the identified gallery/exhibit.

As an alternative, or supplement, to the proximity detectors 436 positioned at the exhibits 432, the IR transmitters 434 can provide gallery and exhibit identification to the portable interface device 300 via the IR receiver 370 internal to the user selection device 100. According to exemplary embodiments, each IR transmitter 434 continually transmits a gallery/exhibit identification code (e.g., xx/yy, where xx represents the particular gallery, and yy represents the particular exhibit; as is described in greater detail below, the transmitted code can also include an audio-video time synchronization code and/or other information), and the visitor is instructed to aim the user selection device 100 at an easily recognizable symbol positioned near the IR transmitter 434 while simultaneously depressing the Select key 135. Depressing the Select key 135 momentarily activates the internal IR receiver 370 so that the gallery and exhibit identification can be detected (otherwise, the IR receiver 370 is powered down to conserve the life of the battery 330, which in the embodiment of FIG. 3 powers the components in both the content and control device 200 and the selection device 100).

Alternatively, the IR receiver 370 can sample for exhibit IR, not only when the user presses the select key, but also at fixed intervals. By doing so, the portable interface device 300 can update the user location if necessary (e.g., in the event the user forgets to press the select key when approaching a new exhibit). In still another alternative embodiment, the portable interface device 300 can sample for exhibit IR when the user presses any key to determine the location of the visitor within the museum to thereby identify the exhibit the visitor is experiencing. Additional details regarding the above described IR features of the present embodiment are provided below with respect to the description of FIGS. 8, 9 and 10.

Once the visitor has approached an exhibit, the portable interface device 300 provides the user an opportunity to select additional information about the artifacts in the exhibit. For example, each artifact can be labeled with a unique identifier (e.g., a two or three-digit number), and the visitor can enter the identifier via the numeric keys 155 of the selection device 100. Alternatively, or additionally, the identifiers for the artifacts in the exhibit can be presented to the visitor via the LCD screen 120 upon reception of the gallery/exhibit identification information, and the visitor can select a particular artifact via the integral touch screen 364. Once an artifact identifier has been entered by the visitor, corresponding content is retrieved from the internal hard disk 336 and made available to the visitor (e.g., a compressed MP3 audio file including a narrative and/or music is retrieved and played for the visitor via stereo headphones as described above with respect to FIG. 3, and/or text and images are displayed to the user via the LCD display 120). Ensuring that artifact identifiers are not repeated in adjacent exhibits assists the portable interface device in determining the user location (e.g., when the user enters a numeric entry that is not valid at the most recently selected exhibit, the device can remind the user to make sure he or she has selected the present exhibit).

Once the visitor has completed his or her tour of the facility 400, the visitor returns, or checks in, the portable interface device 300 (e.g., in the same reception area 410 where the device was originally checked out), and the portable interface device 300 is docked in one of the stations 422 for battery recharging and data/content transfer.

Recall, for example, that visitor keystrokes are stored on the internal hard disk 336 as the visitor traverses the facility and selects artifacts of interest. Thus, in the embodiment of FIG. 4, the stored keystrokes (and the unique ticket ID associated with the visitor entering the keystrokes) are downloaded from the docked portable interface device 300 to the user profile database server 454 (where they are thereafter made available to various applications, as described in detail below). Additionally, the content server 456 can, when necessary, upload new content and programming code to the docked portable interface device.

According to exemplary embodiments, the various servers 412, 444, 452, 454, 456 are implemented as personal computers running the well known Windows 2000 operating system (with application specific functionality being provided by software written in the also well known Visual C++ programming language). Additional details regarding the docking and battery charging operations are provided below with respect to the description of FIGS. 11-14.

Figure 5:
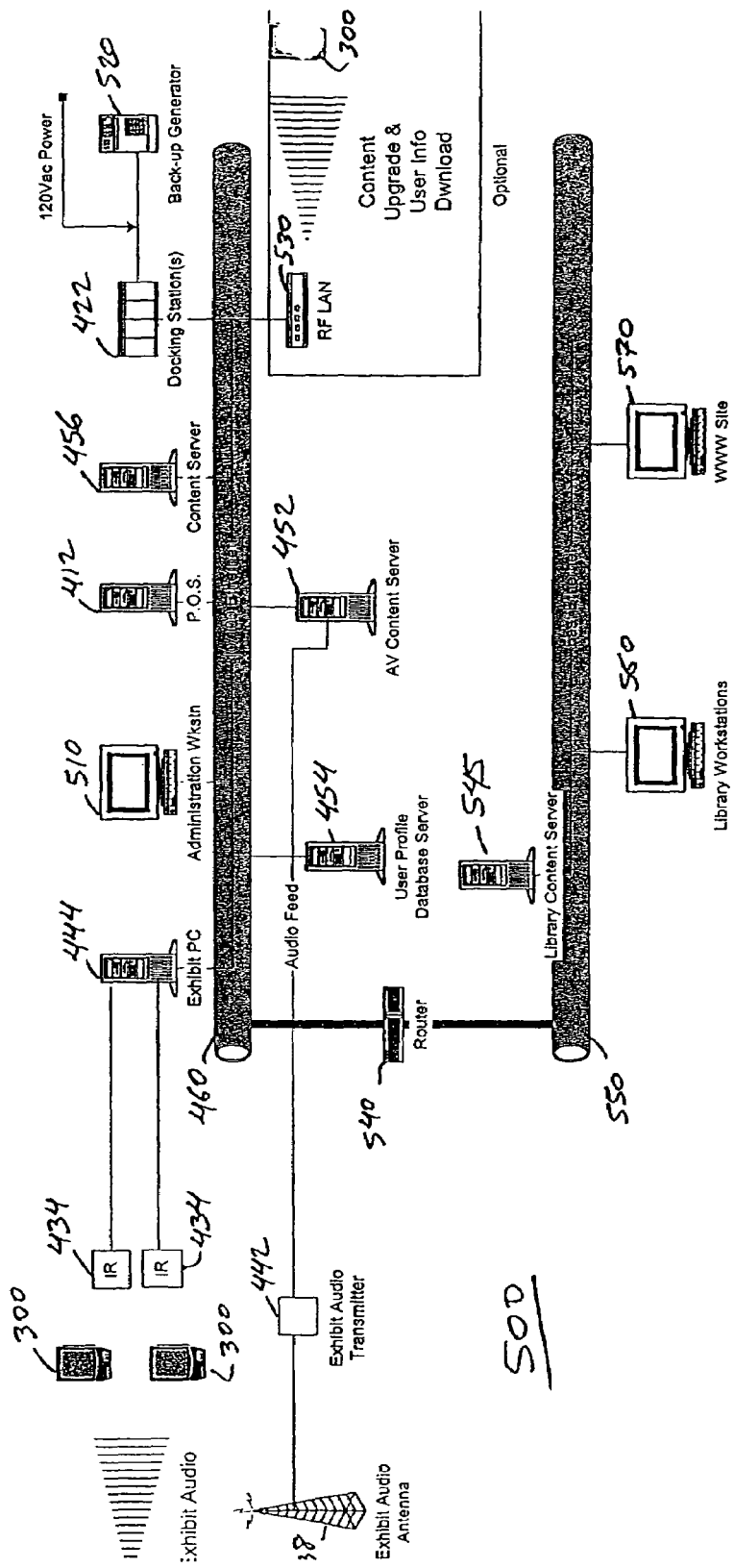
FIG. 5 is a block diagram of an exemplary network configuration within a display facility according to the invention.

FIG. 5 depicts the system communications aspects of the exemplary facility 400 of FIG. 4 in greater detail. In FIG. 5, an exemplary system network 500 includes the POS server 412, a representative docking station 422, two representative JR transmitters 434, a representative RF antenna 438, the RF audio transmitter 442, the JR exhibit server 444, the AV content server 452, the user profile database server 454, the content server 456, and the communications network 460, each connected and operating as described above with respect to FIG. 4. Additionally, the exemplary system 500 includes an administration workstation 510 coupled to the communications network 460, a backup generator 520 coupled to the docking station 422, and an optional RF LAN 530 coupled to the communications network 460. Also in the figure, a network router 540 is coupled between the communications network 460 and a fast communications (e.g., fast Ethernet) network 550. A library content server 545, a library workstation 560, and a WWW site station 570 are coupled to the fast network 550.

In operation, the administration workstation 510 is used to access one or more of the servers 412, 444, 452, 454, 456 for purposes of system maintenance and diagnostics (note there may be one administrative workstation 510 for each of the various servers, or a given one administrative workstation 510 can be used to access multiple servers). As described above with respect to FIG. 3, the optional RF LAN 530 can be used for data upload and download to and from the portable interface device 300 (e.g., without requiring that the portable device 300 be docked in a docking station 422). In the system 500 of FIG. 5, user profile data stored in the user profile database server 454 can be made available (e.g., via the network 460, or via the router 540 and the fast network 550) to various applications (as is described in detail below) in order to extend the visitor experience beyond the actual display facility. For example, the library workstation 560 can be made available to facility visitors (e.g., in an area proximate the display galleries) so that they can access the artifacts they selected during their visit and thereby obtain yet more detailed information relating to those artifacts (e.g., from the library content server 545). Additionally, visitors can, after having left the facility, access the selected artifacts via the WWW, as is indicated in FIG. 5 by the WWW site station 570 (it will be appreciated that the WWW station 570 need not be connected directly to the fast network 550, but can be literally any computer connected to the WWW anywhere around the world).

The above described features of the invention are hereinafter illuminated by way of a description of a typical visitor walk through (e.g., a typical visitor experience within the facility 400 of FIG. 4). Although a facility can be any one of a number of known facility types, the facility is, for ease of discussion, hereinafter presumed to be a museum displaying artifacts relating specifically to music (e.g., clothing and instruments previously belonging to well known musicians, video footage and static images of the musicians, etc.).

As the visitor enters such a music museum, docents positioned in the museum reception area can direct the visitor to purchase a ticket and check out a portable interface device. Additionally, a training video can be playing on video displays in the reception area to present the visitor with basic instructions for using the portable selection device in the music museum. Once the visitor has purchased a ticket and the sale is complete, the POS system prints out a uniquely barcoded ticket, and the portable interface device is checked out to the particular visitor (i.e., the visitor ticket ID is uploaded to the portable interface device ). From this time, and until the device is checked back in, the device records all visitor button presses and associates them with the unique visitor ticket ID. During the check out process, additional information can be exchanged with the portable interface device in order to personalize the device to the visitor, as is described in more detail below.

Figure 6A:
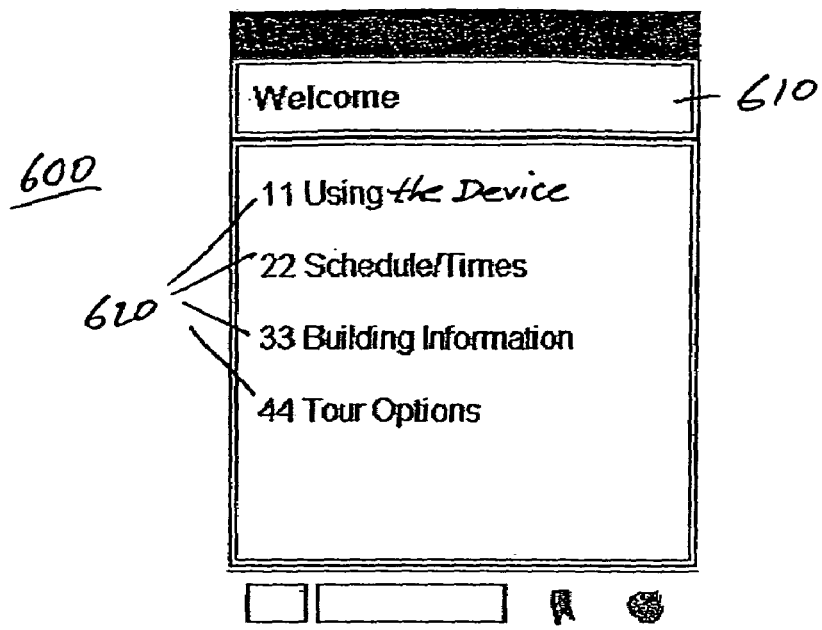
FIGS. 6A and 6B depict exemplary screen displays on a portable user selection device according to the invention.

As the visitor leaves the check out counter, a docent can direct the visitor to an orientation area to receive detailed instruction on wearing and operating the portable interface device. Upon completion of the presentation of instructions, the docent can further point out that the user selection device is displaying a starting, or home, museum page such as that shown in FIG. 6A. The home page can be set up, for example, so that the user can select (via the numeric keys or the integral touch screen of the user selection device) additional instructions on device operation, or choose one of several available visitor programs for use in the museum (e.g., one visitor program might allow the user access to information on all exhibits, artifacts and galleries, while another visitor program might allow access only to information on artifacts related to a particular topic, such as jazz greats and their instruments).

As the visitor enters a gallery, the proximity loop located at the gallery entrance indicates such to the portable device. At that time, a gallery introduction audio clip (e.g., retrieved from the internal hard disk), a gallery specific background audio clip (e.g., received via the internal RF receiver from a proximate gallery transmit antenna), and/or a gallery specific LCD display page is presented to the visitor to properly welcome him or her to the gallery, and to reinforce proper use of the portable selection device in that space. As the introduction clip is played, the visitor can use the various keys on the user selection device to stop, pause, play, fast forward or fast rewind through the audio clip, just as with the familiar controls on conventional video and audio cassette recorders. The end of the introductory audio clip can be used to refresh the visitor on how to use the select key on the user selection device to select a particular exhibit (e.g., point at the symbol near the exhibit IR transmitter while simultaneously pressing the select key).

Once a particular exhibit is selected, the portable interface device begins to play back an exhibit specific introductory audio clip from the internal hard drive. The introductory audio clip presents information about the exhibit as a whole, and may give the majority of users all the information they desire regarding the entire exhibit. As the exhibit specific clip plays back, the visitor is able to use the transport keys on the portable selection device to stop, pause, play, fast forward and fast rewind through the clip.

During the playback of the exhibit introduction audio clip, the portable selection device display screen presents additional information options related to the exhibit. For example, in the context of a music museum, at least two groups of options can be presented to the visitor. A first group, referred to herein as liner notes, is a list of high-level audio clips that provide additional information on the exhibit as a whole (though more detailed than that presented in the exhibit introduction audio clip). Each selection in the liner note list has an associated number, and the user can enter the number on the portable selection device keypad, or by touching the item on the touch screen. Once a liner note is selected, a liner note audio clip is played back from the internal hard drive, and a corresponding text page is presented on the display screen of the portable selection device. Advantageously, liner note text pages can include links to related information about the exhibit. For example, a liner note can include an "if you like this, then you should check out . . . " type of statement which points the user to other exhibits in the museum or to upcoming events in the area. As a liner note clip plays back, the visitor can use the transport buttons on the portable selection device to stop, pause, play, fast forward or fast rewind.

Figure 6B:
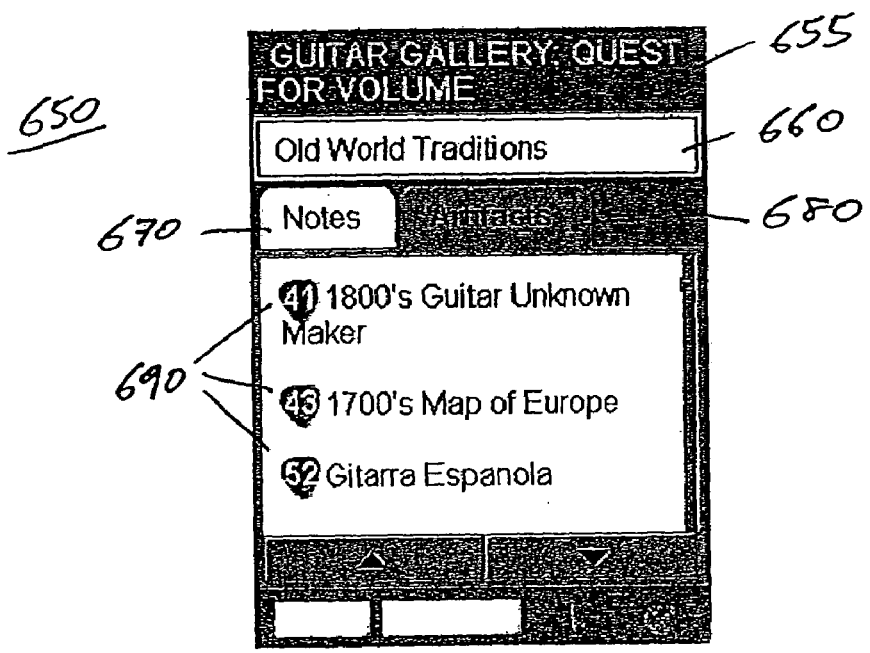

A second group of options, referred to herein as artifact clips, is a list of audio clips associated with artifacts displayed in the exhibit. Such artifact audio clips give detailed information about the particular displayed artifacts. Each selection in the artifact clip list has an associated number which is displayed on the selection device display screen (see FIG. 6B) and affixed to or adjacent the corresponding physical artifact in the exhibit. The user can enter the number via the selection device keypad or by touching the item on the display screen. Once an artifact clip is selected, the clip is played back from the internal hard drive, and an artifact text page associated with the artifact audio clip is presented on the selection device display screen. Like liner note text pages, each artifact text page can include a link to related information about the artifact. As an artifact audio clip plays back, the user is able to use the transport keys on the selection device to stop, pause, play, fast forward or fast rewind through the artifact audio clip.

In addition to physical artifacts, an exhibit can include one or more video displays. Such displays can, for example, present concert footage, musician interviews, product information, etc. (e.g., presented to the visitor via a conventional monitor, a television, a plasma screen, a flat panel display, or any other suitable display device). According to exemplary embodiments, each of these video displays is treated like any other artifact. In other words, each video display has an identifier, which is affixed adjacent to the display and made available via the selection device display screen. When the user enters the ID associated with a video display, the portable selection device can tune the internal RF audio receiver to an appropriate channel in order to pick up the associated audio via a nearby gallery transmit antenna.

Alternately, when the user enters an ID associated with a video display, the portable selection device can retrieve a corresponding audio file (e.g., from the internal hard drive 336) to thereby produce an audio presentation associated with the video presentation. However, since the video information is typically transmitted to the display device from the video server 452, the embodiments of the invention include a synchronization scheme to ensure that the audio produced by the portable interface device 300 is in synchronization with the video displayed by the display device. To accomplish the synchronization in an example embodiment, the video server 452 includes a synchronization application that periodically reads a time code from the video source, which in this embodiment is a conventional hard drive. The time code read by the synchronization application corresponds to the position in the audio file where audio for the playback should occur. The synchronization application also retrieves information to identify the audio file associated with the video presentation. In this embodiment that information is included in a video source ID. The video server 452 periodically transmits the most recently retrieved time code and the video source ID to the exhibit server 444 for transmission to the portable interface device 300. It will be appreciated that such a time code/video ID transmission scheme can be implemented for each one of any number of video presentations in the museum or public space.

The exhibit server 444 includes the video processing application configured to receive and decode the data being broadcast by the video server 452. The exhibit server 444 transmits the video source ID and time code to the appropriate IR transmitter(s) 434 (potentially via an IR multiplexer, as is described in detail below with respect to FIGS. 8-10). According to exemplary embodiments, the video source ID and time code are conveyed only to those IR transmitters 434 that are in close physical proximity to the video display device. Consequently, a visitor viewing the video display will also be near an IR transmitter 434 that is broadcasting the video source ID and time code corresponding to the video presentation of interest.

The IR transmitter 434 receives the video source ID and time code, reformats the information, and broadcasts the video source ID and time code through the IR LED modules for reception by nearby portable interface devices 300. To accomplish these tasks, the portable interface device 300 includes the current context controller application that processes the infrared gallery/exhibit data that includes the video source ID and time code.

The processed video source ID and time code are passed from the current context controller application to a media controller application in the portable interface device 300, which includes an audio player capable of playing audio files (e.g., stored in the well known MP3 audio format). Upon receiving the video source ID and time code data, the media controller application resolves the location of the audio file on the hard disk, and initiates playback of the audio file at the position indicated by the time code. Although any suitable audio player can be used, the present examplary embodiment uses the well known WavePlayer application, which is controlled by the media controller application with Windows messaging controls. As subsequent time codes are received, the audio playback position is updated to ensure synchronization with the video presentation.

For playback to continue uninterrupted, the audio file is copied faster than it is being played back. In order for playback to begin as soon as possible, the audio file is copied in small increments at the playback point determined by the time code. As the retrieval of the audio file advances ahead of the playback, the incremental size of each read and write (i.e., each segment of audio copied) increases.

In this exemplary embodiment, the time code selected by the video server 452, which corresponds to the position in the audio file where playback should begin, is dependent on a number of variables. The time code is transmitted from the video server, received and transmitted by the IR transmitter 434 (potentially after first being received and transmitted by an IR multiplexer), and received by the portable interface device 300. In addition, after the portable interface device 300 receives the synchronization information, the portable interface device 300 must find the audio file, find the position in the file where playback should begin, and then produce the audio to the visitor. Each of these steps consumes a finite amount of time that is considered when determining the appropriate time code.

In addition, the time required for the video data to travel from the video server 452 to the display device is also considered when determining the time code. Furthermore, the time code (and video data) may travel a different distance, through a different number of components, and through a different variety of components for each audio/video presentation. Consequently, the lead time (or lag time) for the time code, relative to the video data, can be different for each audio/video presentation. After considering the above factors, as well as other factors that can be present in other embodiments and implementations of the present invention, the time code is ultimately selected so that the audio and video presented to the visitor are in synchronization. In exemplary embodiments, each exhibit server stores a variable time code for each video presentation within the corresponding exhibit, and these variable time codes are adjusted (e.g., via user input to the exhibit server) based on empirical observations when the museum or other public space is initially set up.

With regard to retrieval of any of the above described information elements (e.g., the gallery, exhibit, artifact, liner note information elements), it should be noted that content caching can be used, according to exemplary embodiments, to conserve battery life and to reduce playback delay (both objectives being achieved by reducing the number of times the hard drive is spun up for read access). For example, when the user makes an exhibit selection, the content and control device can begin caching applicable audio content into memory (e.g., for the presently selected exhibit and for nearby exhibits).

Advantageously, if the information provided by an exhibit, liner note, or artifact audio clip or text page is insufficient to satisfy the visitor, the visitor can use the bookmark key of the selection device to record the identification of the element of interest for later use outside the museum. For example, while an exhibit page, liner note text page or artifact text page is being presented to the user, the user can press the bookmark button to log the identification of the element the user wants more information about (along with, e.g., a time stamp, the visitor ticket ID, and any other pertinent data). Then, after completing the museum tour, the visitor can use the logged bookmarks as filters into the WWW, or into a workstation database located on the museum premises, to obtain even more detailed information related to the element of interest.

In addition to collecting bookmarks, the portable interface device can, as noted above, record literally every keystroke made by the visitor during his or her tour of the museum. Moreover, the portable interface device can be programmed to collect more directed input from the user (e.g., by asking questions such as "How did you like that exhibit?"). Following the visitor's tour of the museum, such keystroke and query information can be processed by the user profile database server to create usage reports for museum exhibits, to aid in marketing products associated with the museum, etc.

Once the visitor has completed his or her tour of the music museum, the visitor is instructed to take the portable interface device to a return, or check in, station (e.g., in the reception area where the visitor originally purchased a ticket). At that time, the unique ticket ID stored within the portable interface device is read, the check out record is accessed via the POS server, and the user session is closed out for the particular portable interface device.

The information collected on the hard drive during the user's visit to the music museum (e.g., bookmarks, other keystrokes, answers to queries, etc.) is downloaded to the user profile database server. More specifically, an application running on the user profile database server pulls the bookmarks from the portable interface device at docking. The bookmarks are stored, on the portable interface device and on the user profile database server, in a table including the unique user identifier (e.g., the ticket ID), the identifier for each element being bookmarked, and additional data such as time and date stamp information associated with the each bookmark action.

Once the bookmarks have been pulled to the user profile database, software interfaces allow other systems to read and utilize the bookmark records to extend the visitor experience beyond the actual museum tour. For example, workstations (e.g., the library workstation 560 of FIG. 5) can be set up within the museum facility so that a visitor can use his or her downloaded bookmark information as a filter into more information about what is being displayed within the museum. Additionally, an interface between the user profile database server and the POS server can match bookmark information back to the ticket ID at the display facility so that an ongoing dialog can be established between the facility and its visitors based on the known likes of the visitors (e.g., concert mailings can be targeted to visitor groups sharing a common musical taste). Advantageously, the POS server can also use the bookmark information to tailor a portable interface device to a particular known user based on the user's previous selections. Moreover, a museum or third party web site can be tailored to aid further research related to recorded bookmarks. For example, visitors to such a site can use their ticket ID as a log in key, and the bookmarks can be linked to additional product or service information on the web.

Figure 7:
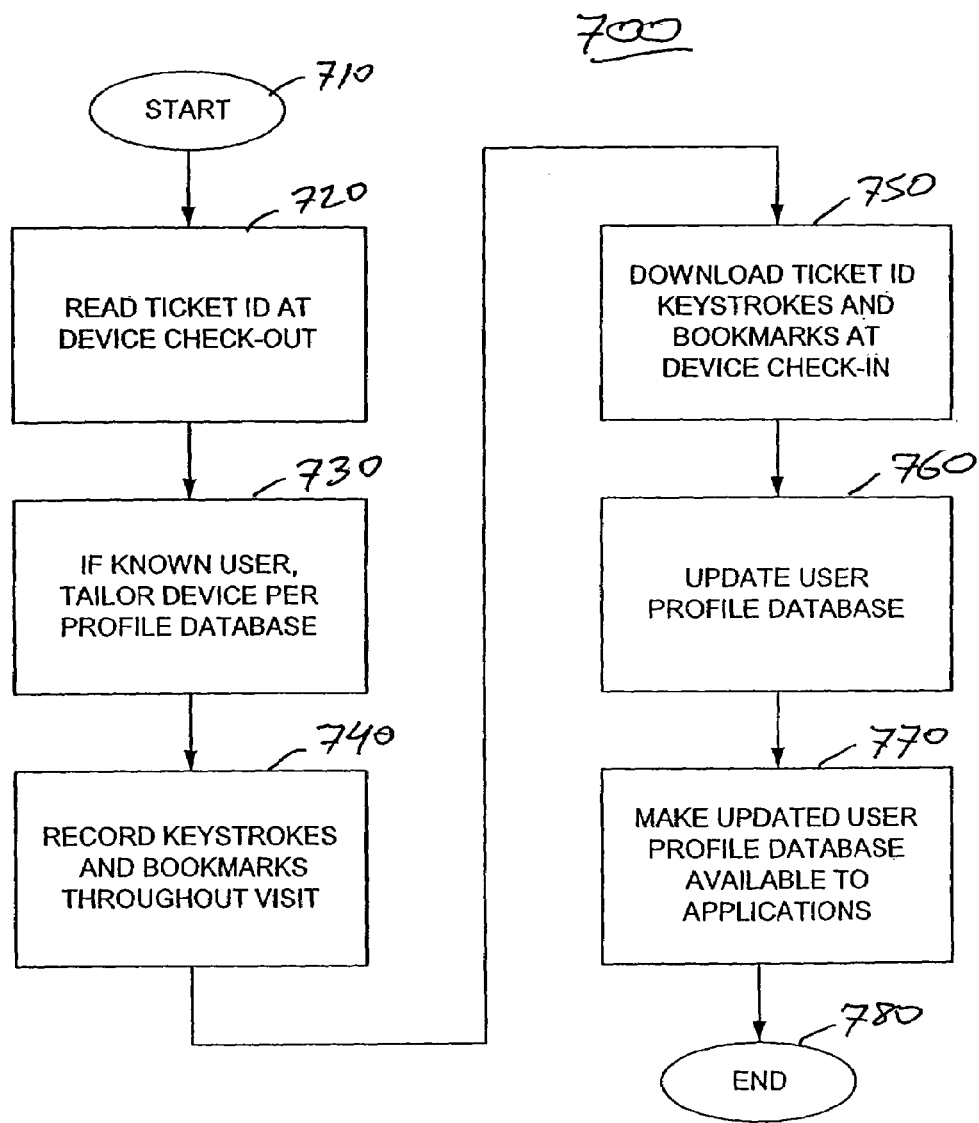
FIG. 7 is a flow chart depicting steps in an exemplary method of capturing and utilizing visitor activity within a display facility or other public space in order to enhance the visitor's experience while in the display facility or other public space and/or to extend the visitor's experience beyond the display facility or other public space.

FIG. 7 depicts steps in the above described exemplary method of capturing and utilizing bookmarks according to the invention. As shown, the method 700 begins at step 710, and at step 720 the visitor ticket ID is uploaded to the portable interface device at device checkout. If the visitor is a known facility user (i.e., data already exists for the visitor in the user profile database), device operation can be tailored for the visitor based on past preferences at step 730. Thereafter, at step 740, the visitor's keystrokes and bookmarks are recorded and stored in the portable interface device throughout the duration of the user's visit to the facility. Upon the user's returning the portable interface device, the user's ticket ID and recorded keystrokes and bookmarks are downloaded at step 750, and the user profile database is updated at step 760. Thereafter, at step 770, the updated user profile database is made available to external applications which utilize the bookmarks to extend the visitor's past tour experiences (or to enhance subsequent tour experiences), and the process concludes at step 780.

Turning now to a more detailed description of certain of the IR aspects of the exemplary embodiments, it should be noted that communications between the exhibit server 444 and the IR transmitters 434 can, according to embodiments of the invention, be facilitated via one or more intermediate IR multiplexers. For example, in certain embodiments, an exhibit server 444 is coupled to a plurality of IR multiplexers, which in turn, are each coupled to at least one IR transmitter 434. More specifically, each IR multiplexer 480 is connected to the IR exhibit server 444 via a four port multifunction serial adapter card configured as an RS-422 transceiver.

Thus, each IR multiplexer 480 provides both physical and logical connections between the IR exhibit server 444 and up to eight IR transmitters 434. Each IR multiplexer 480 has a distinct address with sub addresses for each of its IR transmitters 434, which allows the exhibit server 444 to individually address each IR multiplexer 480 and IR transmitter 434. In this addressing scheme, data and/or control signals addressed to an IR multiplexer 480 can be subsequently transmitted to the sub addressed IR transmitter 434.

Figure 8:
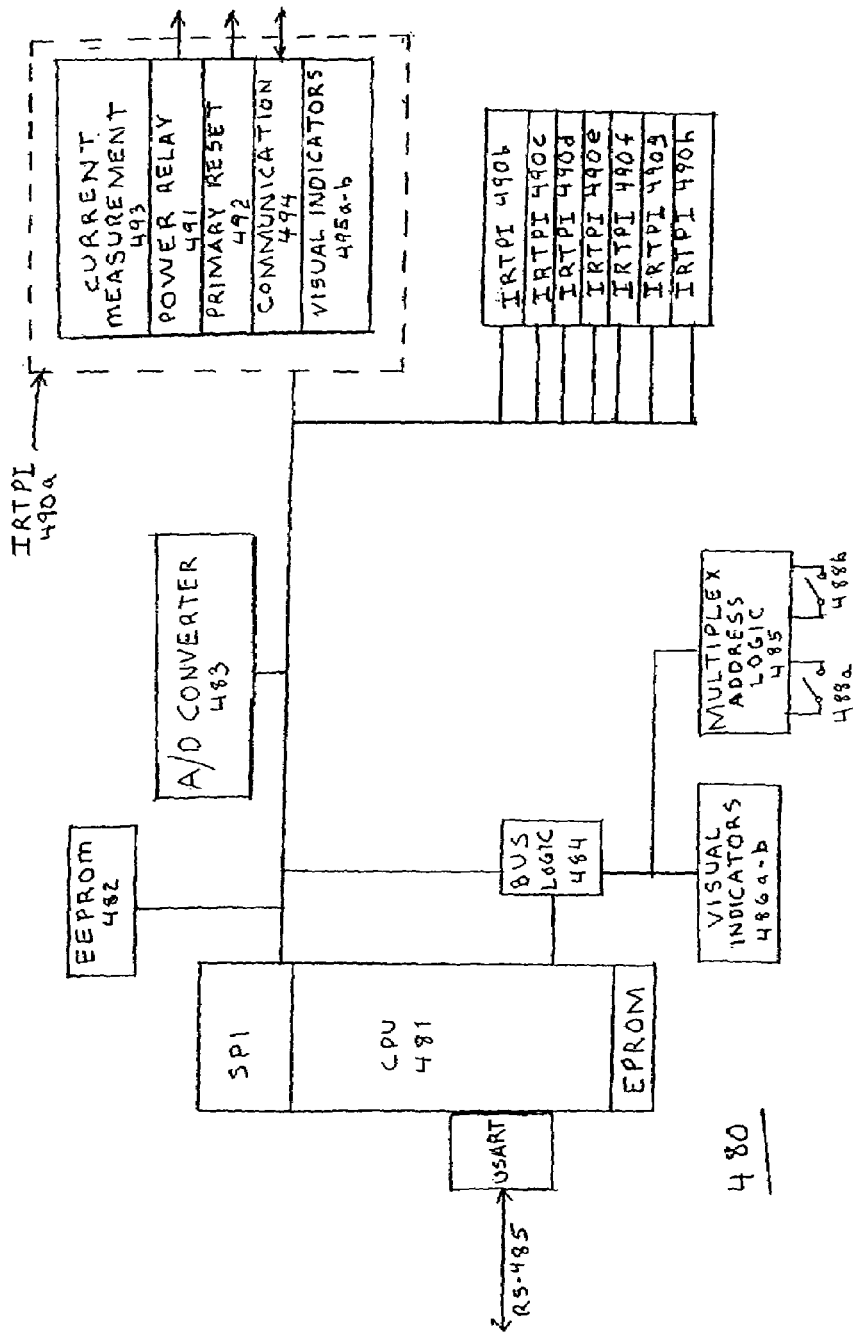
FIG. 8 is a schematic representation of an IR multiplexer according to the invention.

The number of IR multiplexers 480 required for a particular application is a function of the number of IR transmitters 434 needed, the physical locations of the IR transmitters, and other factors. Because all of the IR multiplexers 480 include the same components and operate identically at different addresses, only one IR multiplexer 480 will be described in detail. As shown in FIG. 8, each IR multiplexer 480 includes a CPU 481, an EEPROM 482, an Analog-to-Digital converter (ADC) 483, bus interface logic 484, multiplexer address logic 485, and visual indicators 486. The IR multiplexer 480 also includes eight IR transmitter port interface circuits 490a-h for interfacing with up to eight IR transmitters 434. In this exemplary embodiment, the CPU 481 is a well known PIC 16C63 and contains internal EPROM memory, a watchdog timer, auto reset and brown-out detection, a Universal Synchronous/Asynchronous Receiver/Transmitter (USART), a Serial Peripheral Interface (SPI), and bus logic. The internal USART facilitates communications between the IR Exhibit server 444 and the IR multiplexer via an RS-485 communication link. The SPI is used for communications between the CPU 481 and the EEPROM 482, ADC 483, and the USARTs residing on each IR transmitter port interface circuit 490a-h. Bus logic 484 can be configured so as to provide multiple functionality, such as for reading the multiplexer address, push-to-test buttons (not shown), controlling power to individual IR transmitters, and operating the IR transmitter reset, and the visual indicators.

The IR multiplexer 480 also includes two binary coded decimal rotary switches 488a, 488b with one switch representing tens and the other switch representing ones. The IR multiplexer CPU 481 reads the rotary switches 488a and 488b to determine the IR multiplexer's address setting. Each IR multiplexer 480 identifies the data packets that are addressed to it by comparing the address determined by the rotary switch 488 settings with the address contained in packets received from the Exhibit server 444. This addressing feature allows the address of the IR multiplexer 480 to be easily changed by rotating the switches.

The EEPROM 482 provides nonvolatile data storage for storing the most recent data received for each IR transmitter 434. In the event of loss of communications with the Exhibit server 444, the IR multiplexer 480 can continue to transmit the stored data to each IR transmitter 434 until communications with the server 444 are restored. In exemplary embodiments, the previously stored gallery/exhibit identifiers are transmitted during power interruption, while the above described audio-video synchronization information (e.g., a time code and video ID) is not transmitted until power is restored.

The IR multiplexer 480 also includes a push-to-test button (not shown) that is externally accessible. When the push-to-test button is depressed, a "hard" reset is initiated followed by the IR multiplexer self-test. During self-test the CPU 481 executes a number of stored procedures that perform diagnostics on the IR multiplexer 480 such as verifying the EEPROM 482 functionality.

The IR multiplexer 480 includes two visual indicators 486a and 486b. The first visual indicator 486a is a power LED, which indicates whether power to the IR multiplexer 480 is ON or OFF. The second visual indicator 486b is a status LED, which can provide three different indications. Green illumination of the status LED 486b indicates that the IR multiplexer self-test was completed successfully. Red indicates that the IR multiplexer 480 detected an error during self-test (such as an error in the EEPROM 482 ) and no illumination indicates that there has been no communications with the Exhibit server 444 since power up or reset.

As discussed, the IR multiplexer 480 includes eight IR transmitter port interface circuits 490a-h (referred to hereinafter as IRTPI circuits 490a-h) corresponding to the associated IR transmitters 434. Thus, each IR multiplexer 480 controls and communicates with each of its eight IR transmitters 434 through one of its eight IRTPI circuits 490. Because all IRTPI circuits 490a-h include the same components and operate identically at different sub addresses, only one will be described in detail.

Referring to FIG. 8, each IRTPI circuit 490 includes a power relay 491, primary reset circuitry 492, current measurement circuitry 493, communication circuitry 494, visual indicators 495, and a push-to-test switch (not shown). The power relay 491 in each IRTPI circuit connects and disconnects power to the IR transmitter 434 and is used to hard reset the IR transmitter 434 or disable the IR transmitter 434 if necessary. The communication circuitry 494 provides an RS485 interface for communication between the IR multiplexer 480 and the respective IR 485 transmitter 434.

As will be discussed in more detail below, each IR transmitter 434 includes a plurality of IR LED modules that broadcast the desired infrared data for reception by the portable interface devices 300. The IR multiplexer 480 can measure the current being used by any particular IR LED module on an IR transmitter 434 to determine if the IR LED module is working properly or has failed. To measure the current used by a particular IR LED module, the ADC 483 in the IR multiplexer 480 converts the voltage generated by the IRTPI's current measurement circuit 493 to digital data for use by the CPU 481 and transmission to the Exhibit server 444. The current measurement circuit 493 supplies a voltage to the ADC 483 that correlates to the peak voltage across a resistor supplying current to the IR transmitter 434. As discussed, each IR transmitter port 490 can be individually selected and read by the CPU 481. During the test, data is transmitted from the IR multiplexer 480 to each individual IR LED module of the selected IR transmitter 434 while the ADC 483 measures the voltage supplied by the current measuring circuit 493. The IR multiplexer CPU 481 then determines whether the measured value is in or out of proper operating range. If the measurement is out of range, the Exhibit server 444 is notified and a visual indicator is illuminated on the IR multiplexer front panel. The current measurement can be initiated by depressing the IRPTI circuit push-to-test button located on the front panel of the IR multiplexer 480 or by a command from the Exhibit server 444.

Each IRTPI circuit 490 includes two visual indicators (LEDs) 495a-b. The first visual indicator 495a indicates transmission and receive activity for each IRTPI circuit 490. The second visual indicator 495b is a status LED, which can provide three different indications. Green illumination by the status LED 495b indicates that the IR transmitter 434 is connected and a valid message sent and received. Red indicates that the IR transmitter 434 is connected to the IRTPI circuit 490, but a valid message was not sent and no illumination indicates that there is no IR transmitter 434 connected to the IRTPI circuit 490.

Figure 9:
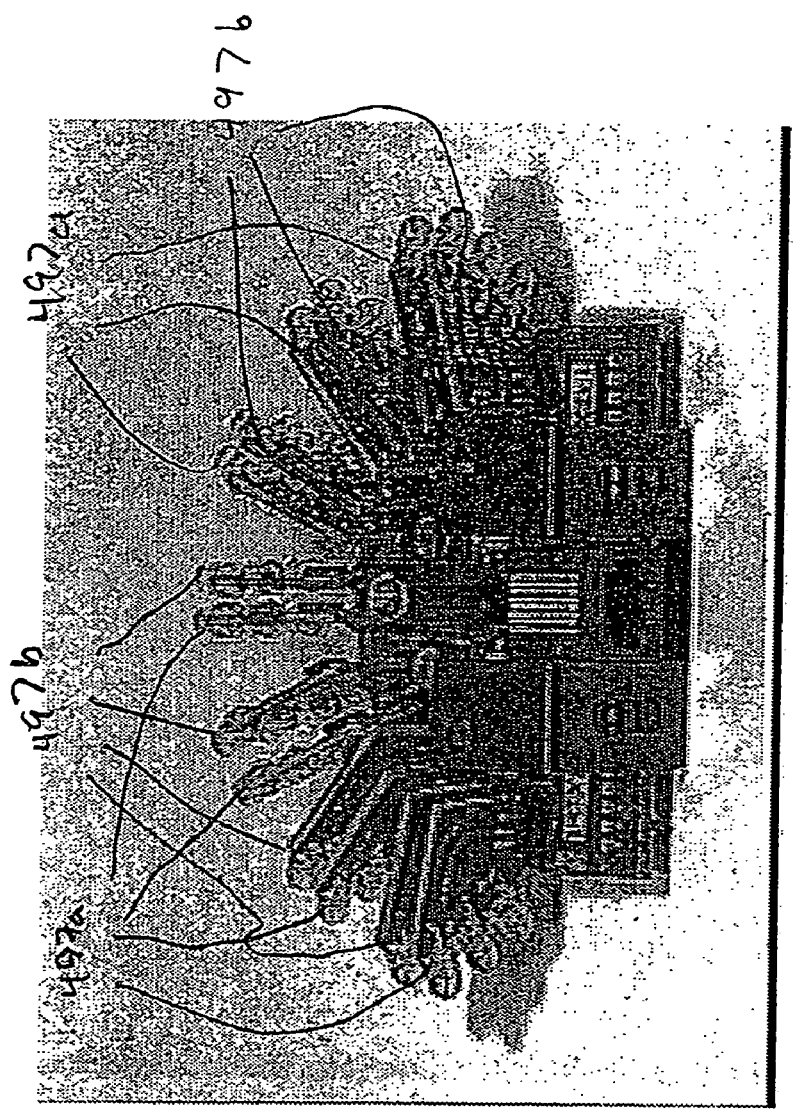
FIG. 9 depicts an IR transmitter according to an exemplary embodiment of the invention.

As shown in FIG. 9, the IR transmitter 434 in this embodiment is semicircle in shape and includes fourteen IR LED modules 497 arranged in seven pairs. One of the IR LED modules from each of the seven pairs is a primary IR LED module 497a and the other from each pair is a backup IR LED module 497b. Each IR LED module 497 includes three infrared LEDs, a transistor driver, and voltage buffering components. Each IR transmitter 434 includes a primary control circuit for operating the seven primary IR LED modules 497a and a backup circuit for operating the seven backup IR LED modules 497b. The backup circuit and backup IR LED modules 497b increase the reliability of the IR transmitter 434 by providing redundancy. Although not shown in FIG. 9, each IR transmitter 434 is housed in a semi-transparent, plastic housing that protects the IR transmitter 434 circuitry while permitting infrared broadcasting by the IR LEDs.

Figure 10:
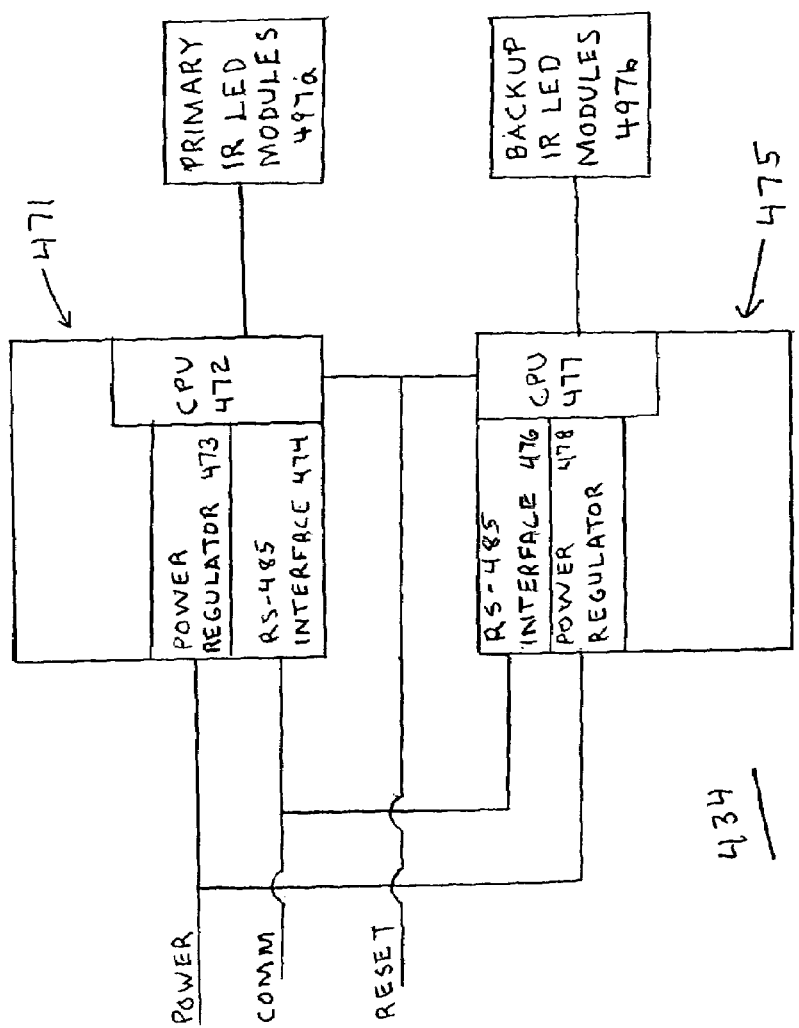
FIG. 10 is a schematic representation of an IR transmitter according to the invention.

As shown in FIG. 10, an exemplary primary circuit 471 of an IR transmitter 434 includes a CPU 472, a power regulator 473 and an RS-485 interface 474 for communicating with the IR multiplexer 480. While in normal mode, the CPU 472 controls communications between the IR transmitter 434 and IR multiplexer 480, formats the data received, and transmits data to the primary set of LED modules 497a.

FIG. 10 also depicts an exemplary backup circuit 475, which includes its own RS-485 interface 476, CPU 477, and power regulator 478. In backup mode, data received by the IR transmitter 434 is passed to the backup set of IR LED modules 497b by the CPU 477 of the backup circuit 475 without formatting the data.

As discussed, the IR multiplexer 480 can operate its associated IR transmitters 434 in normal or backup mode. When the primary reset circuitry 492 of a particular IRTPI circuit 490 is not activated, the corresponding IR transmitter is operating in normal mode. To switch to backup mode, the IR multiplexer 480 actuates the primary reset circuitry 492 of the appropriate IRTPI circuit 490. The primary reset circuitry 492 then pulls the reset line of the CPU 472 of the primary control circuit to a logic low to hold the CPU 472 of the primary control circuit 471 of the IR transmitter 434 in reset (in an inactive state). This reset provides a reset for the CPU 472 only (as opposed to resetting the entire primary control circuit 471), and subsequent transmissions to the IR transmitter are received by the backup circuit 471, which employ the backup IR LED modules 497b to radiate the gallery/exhibit identifying information.

During normal operation, the primary IR LED modules 497a (i.e., one from each of the seven pairs of IR LED modules) are operated contemporaneously to transmit the gallery/exhibit identifying information (and, optionally, the above described audio-video synchronization information—e.g., a time code and video ID) to any user selection device 100 within reception range that is sampling for IR data. In normal mode, the backup circuit 475 monitors the transmission pulse durations and frequency to ensure that the infrared LEDs in the IR LED modules 497a are not ON too long and are OFF for sufficient durations to prevent the infrared LEDs from overheating and failing. If the backup circuit 475 determines that the infrared LEDs in the IR LED modules 497a are not OFF for sufficient durations (either because the ON pulses are too long or the OFF time is insufficient), the backup circuit 475 notifies the IR multiplexer 480, which increases the intermessage delay. The intermessage delay is the time between consecutive information broadcasts and is discussed in detail below.

In backup mode, the backup IR LED modules 497b are operated contemporaneously and are directly controlled by the IR multiplexer 480 to transmit the IR information (i.e., the gallery/exhibit identifying information and, optionally, the audio-video synchronization information—e.g., time code and video ID). Thus, the backup mode provides redundancy, and therefore added reliability to the system.

In this exemplary example embodiment, the semi-circular shape of the IR transmitter 434 and position of the IR LED modules 497 around the annular portion of the IR transmitter 434 allow transmission of the IR information over a 180 degree range in both backup and in normal mode. However, the shape of the IR transmitter, the number and positioning of the IR LED modules, the shape and material of the housing, and number of LEDs in each IR LED module are a design choice based on the application of the transmitter, costs, available technology and other factors.

The communication between the IR Exhibit server 444 and IR multiplexer 480 and between the IR multiplexer 480 and IR transmitters 434 can be accomplished through any suitable communication protocol. The following is an example of one such protocol, which employs the digital transmission of ASCII characters. During communication between the IR Exhibit server 444 and an IR multiplexer 480, the first character received by the IR multiplexer 480 in a valid data stream must be an attention character, which in the present example is a "$". The next two digits received identify the IR multiplexer 480 address. The fourth digit received identifies the IR transmitter 434 (of the eight) to be addressed. The fifth character received is the IR multiplexer command character which can request that the IR multiplexer reset itself (command character "R"), or request the status of the IR multiplexer (command character "S"). Other commands affect the addressed IR transmitter 434 such as transmit data to IR transmitter (command character "D"), IR transmitter status request (command character "X"), power OFF (command character "O"), power ON (command character "N"), push to test function (command character "P"), current usage request (command character "T"), and backup mode command (command character "I"). After the command character for a transmit command (command character "D"), any following characters represent data to be transmitted to the IR transmitter 434 and are echoed back (transmitted) to the IR Exhibit server 444 by the IR multiplexer 480. A carriage return is used to mark the end of a data stream.

In the present example, protocol from the IR multiplexer 480 to the IR transmitter 434 also employs transmission of ASCII characters. The first character received by the IR transmitter 434 in a valid data stream must be an attention character, which in the present example is a "$". The next two characters represent a mask for determining which IR LED modules are being addressed. The valid character set for the mask is any hexadecimal number from "00" through "FF". The fourth digit transmitted represents the baud rate and can be 1, 2, 3, or 4, which correspond to baud rates of 1200, 2400, 9600, and 19,200, respectively. The fifth character represents the intermessage delay and valid characters can be any ASCII numeral from one to zero (i.e., 1, 2, 3, 4, 5, 6, 7, 8, 9, and 0). The intermessage delay is selected in 10 millisecond intervals corresponding to the received character. For example, if a 5 is received as the intermessage delay, the delay is set at 50 ms, while a 9 represents a 90 ms delay, and a 0 represents a 100 ms intermessage delay. Characters after the intermessage delay represent transmission data, which is data to be transmitted to the selected IR LED modules. When not in test mode, the transmission data normally represents, or correlates to, the exhibit/gallery identifying information to be radiated by the IR LED modules. If the message received by the IR transmitter 434 is valid, the string is echoed back (transmitted) to the IR multiplexer 480. Again, a carriage return is used to mark the end of a data stream.

Once it receives a valid data stream, the IR transmitter 434 stores the received data in memory. Until a new valid transmission is received, the IR transmitter 434 repeatedly transmits the stored transmission data (representing the gallery/exhibit identifying information) from the IR transmitter 434 CPU to the selected IR LED modules for radiation and reception by any nearby portable interface devices 300. The IR transmitter 434 broadcasts the data according to the parameters of the stored data. In other words, the transmission data representing the gallery/exhibit identifying information is repeatedly broadcast at the designated baud rate and to IR LED modules determined by the stored valid data stream and with delays between broadcasts corresponding to the intermessage delay identified in the stored data stream. Thus, until the broadcast parameters (i.e., baud rate, IR LED modules, or intermessage delay) change, or the transmission data changes, the IR multiplexer 480 does not need to transmit additional data or control signals to the IR transmitter 434.

Figure 11:
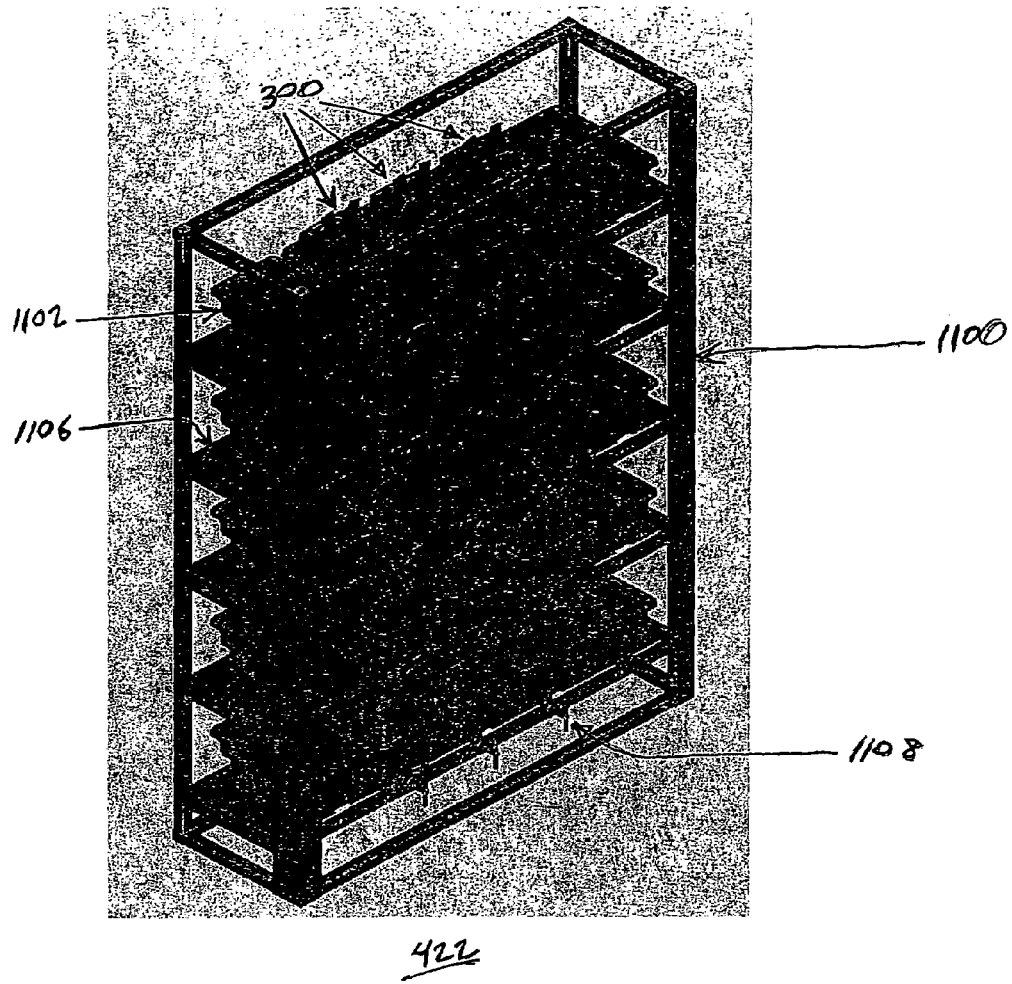
FIG. 11 depicts a portable device docking station according to an exemplary embodiment of the invention.

Turning now to a more detailed description of certain of the docking and battery charging aspects of the exemplary embodiments, FIG. 11 illustrates one example of the docking station 422 of FIG. 4. As shown, the exemplary docking station 422 includes a storage rack 1100, and the storage rack 1100 in turn includes five docking shelves 1106 and a corresponding set of mechanical shelf-actuation handles 1108. In the figure, each docking shelf 1106 is configured to hold five device carriers 1102 (described below with respect to FIG. 12), and each device carrier 1102 is in turn configured to hold four docked devices 300. Consequently, the exemplary docking station 422 of FIG. 11 can simultaneously accommodate one hundred docked devices 300 for purposes of battery charging and/or data/software transfers.

Figure 12:
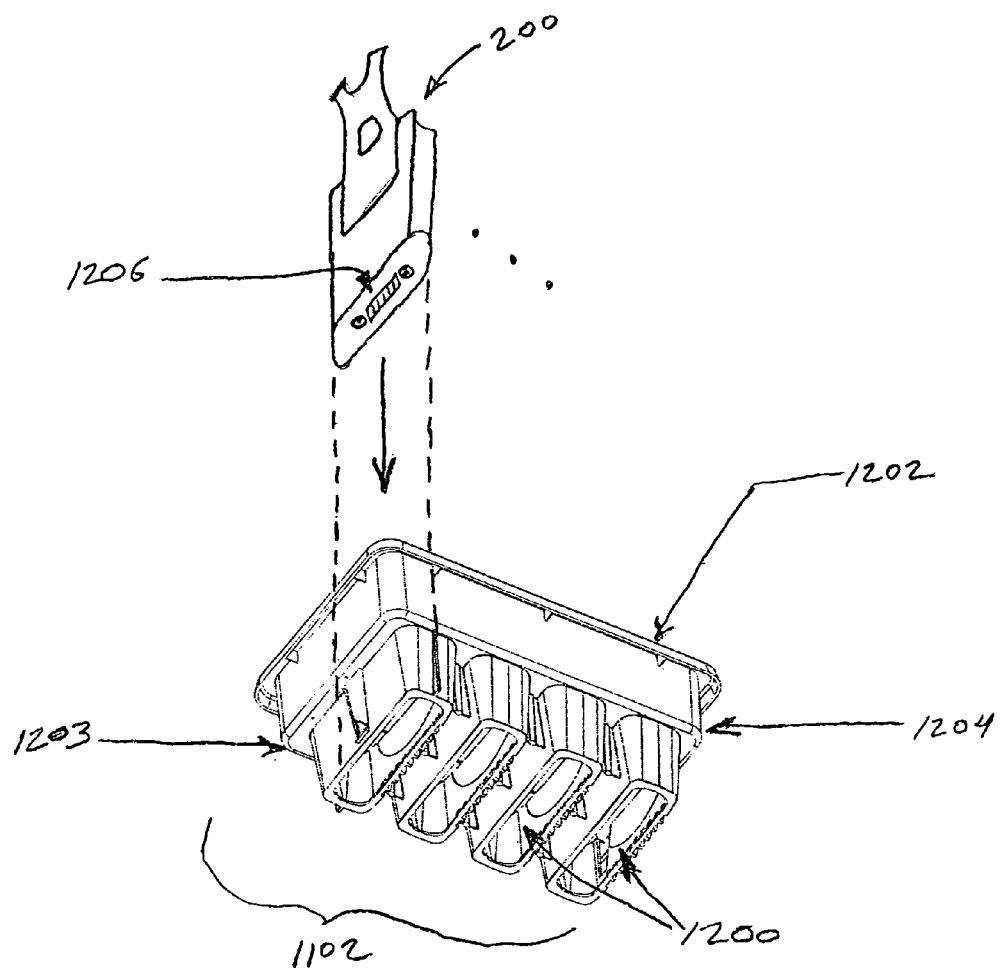
FIG. 12 depicts a portable device carrier according to an exemplary embodiment of the invention.

FIG. 12 illustrates an exemplary device carrier 1102. In the present configuration, carrier 1102 is essentially a molded-plastic tray designed so that four portable devices 300 can be held firmly inside four respective receiving wells. Though the depicted carrier 1102 is designed to hold four portable devices, those of ordinary skill will appreciate that such a carrier can be configured to accommodate any number of devices. As shown, a cut-away 1200 at the bottom of each receiving well exposes an exemplary electrical interface 1206 of each docked device.

According to the present embodiment, the cut-aways 1200 are aligned with corresponding openings in each of the docking shelves 1106 so that each electrical interface 1206 is coupled to a respective printed circuit board (PCB) located immediately underneath each shelf opening. Each PCB is in turn connected to a charging system and to the system network 460 (as is described below with respect to FIGS. 13 and 14) to thereby enable recharging of the batteries within the docked devices and to permit data/software transfer to and from each docked device. Those of ordinary skill will appreciate that alignment between the receiving wells of the carriers 1102 and the respective openings of the docking shelves 1106 can be accomplished via standard mechanical positioning techniques (e.g., guide rails pressed into the docking shelves 1106, slotted rails designed to hold carrier flanges 1202 or carrier shoulders 1204, etc.).

Figure 13:
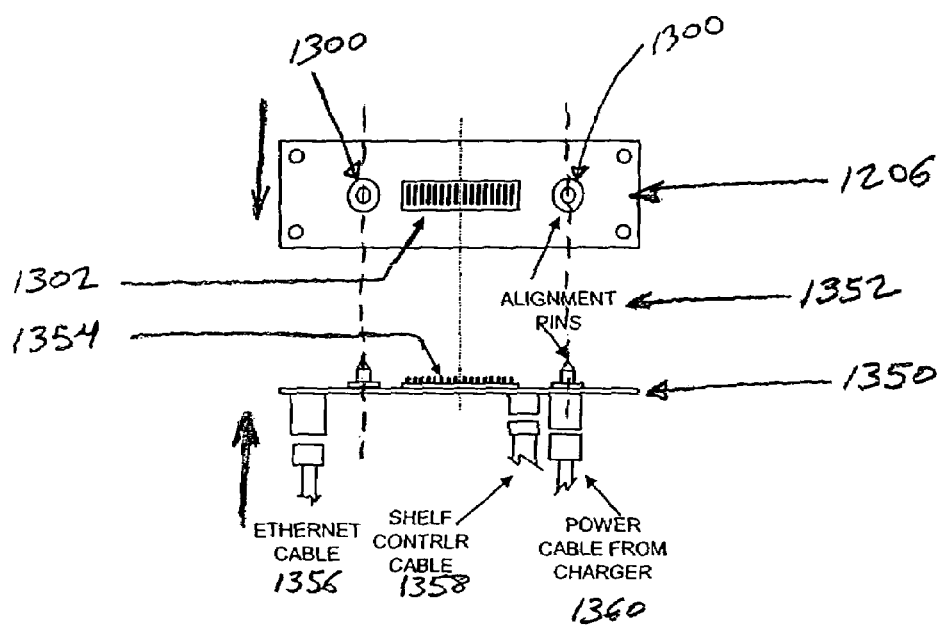
FIG. 13 depicts an interface between a portable device and a printed circuit board (PCB) according to an exemplary embodiment of the invention.

FIG. 13 depicts an exemplary device/PCB interface. As shown, an exemplary PCB 1350 includes a spring-loaded multi-pin connector 1354, certain pins of which are coupled to an Ethernet cable 1356, a shelf controller cable 1358, and a power cable 1360. The PCB 1350 is situated beneath a shelf opening as noted above and, assuming that a device-containing carrier well is properly aligned in the shelf opening, the multi-pin connector 1354 is mated to the electrical interface 1206 of the docked device. Specifically, the mechanical handles 1108 of FIG. 11 are actuated, and the ensuing rotation acts to translate the PCB 1350 toward the device interface 1206 (e.g., via conventional mechanisms for converting rotational motion into translational motion). Vertical upward- and downward-pointing arrows in FIG. 13 indicate the direction of actuation. Though only one device/PCB interface is depicted in FIG. 13, those of ordinary skill in the art will appreciate that a single actuation of the handles 1108 simultaneously mates each device docked in rack 1100 with a respective PCB 1350.

As shown in the exemplary embodiment of FIG. 13, alignment pins 1352 of the PCB 1350 mate with corresponding receptacles 1300 of the device interface 1206 so as to correct any flaws in positioning (e.g., due to inaccurate placement of the carriers in the shelves, or of the docked devices within the carriers). Advantageously, this ensures proper connectivity between electrical contacts 1302 of the device interface 1206 and the spring-loaded connector 1354 of the PCB 1350. Once the pins 1352 and the receptacles 1300 are aligned correctly, and once the contacts 1302 are physically touching the connector 1354, the docked device is ready for battery charging and/or software/data uploads and downloads.

Figure 14:
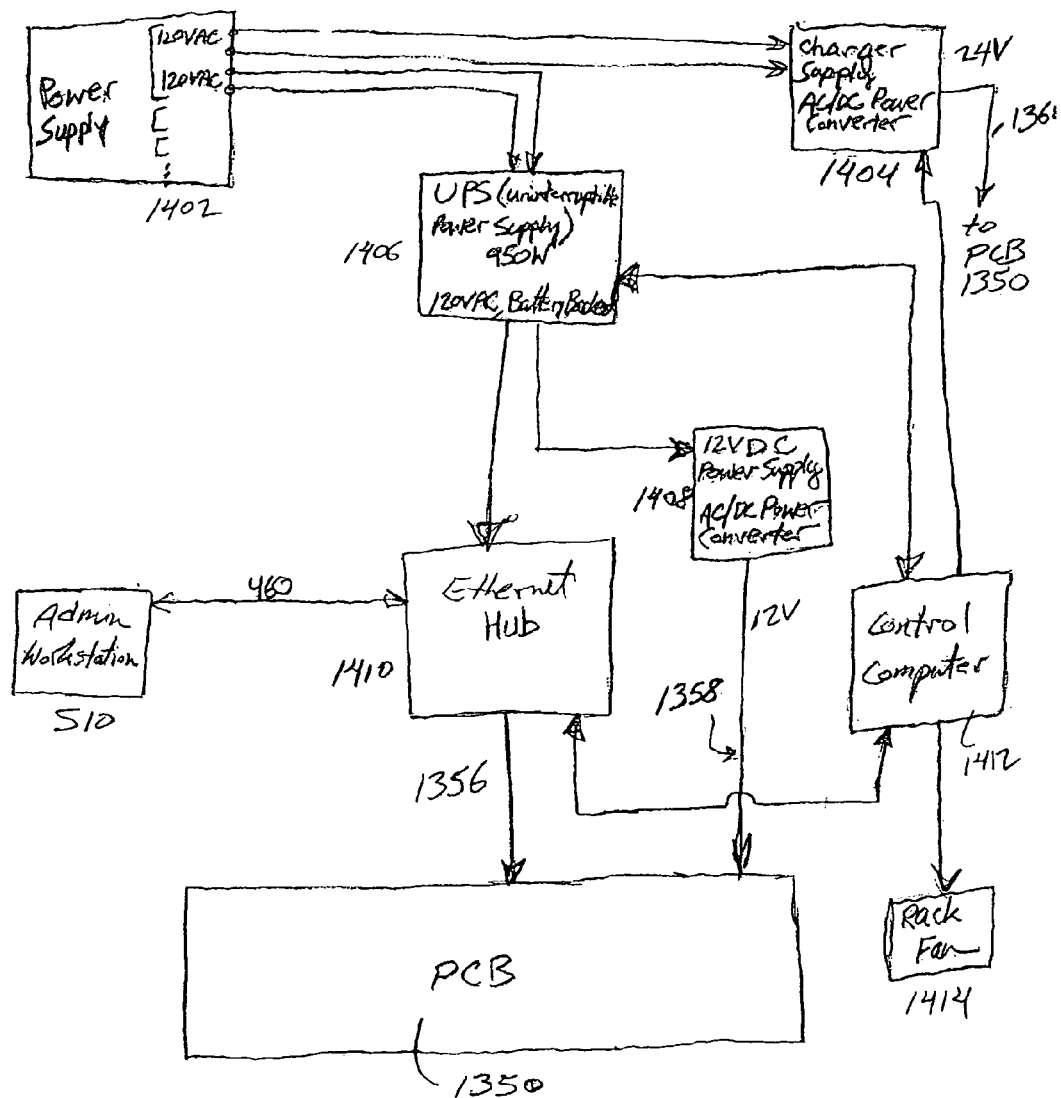
FIG. 14 is a block diagram of a portable device docking station according to an exemplary embodiment of the invention.

FIG. 14 depicts an exemplary charging system configured to operate in conjunction with the system network 500 of FIG. 5. In FIG. 14, the above described details of the rack 1100, shelves 1106 and carriers 1102 are omitted for sake of simplicity, and only a single PCB 1350 is shown. Moreover, electrical connection to a docked device is presumed. As shown, the exemplary charging system includes a power supply 1402 which feeds 120-volt alternating current (AC) power to an uninterruptible power supply (UPS) 1406 and to an AC-DC voltage converter 1404 (it will be appreciated that, in practice, one such converter 1404 is provided for each PCB 1350 of rack 1100). The UPS 1406 provides AC power to a converter 1408, which in turn provides 12-Volt direct current (DC) power to electronics of the PCB 1350 via cable 1358. Additionally, the voltage converter 1404 provides 24-Volt DC power to the PCB 1350, via cable 1360, in order to provide charging current for the device battery (not shown in FIG. 14).

Advantageously, battery charging is controlled by a control computer 1412, which monitors and adjusts the battery charging rate at converter 1404. Specifically, the control computer 1412 can increase or decrease the battery charging rate so as to regulate the speed at which the battery is charged. Monitoring and charge rate control are performed according to conventional methods which either allow the computer 1412 to control the battery charge level according to preprogrammed instructions, or which allow a human user of the computer 1412 (or of the workstation 510) to adjust the charge level as desired (e.g., using a graphical user interface or other conventional data-manipulation tool). As shown in FIG. 14, the control computer 1412 also controls a rack fan 1414, which acts to cool docked devices by dissipating heat created by the battery charging process.

It should be noted that the battery of a docked device can, according to the exemplary embodiments, be recharged any time the device interface 1206 is in electrical communication with the PCB 1350. In the present configuration, a separate charging and server system is provided for each docked device, with power supply 1402 configured to power a number of systems as shown by a multitude of brackets in FIG. 14 (each bracket representing the power outputs required for a single system). Alternatively, only one of each system can be used in conjunction with one or more multiplexers or other technology to allow single host units to communicate with multiple client devices.

As shown in the exemplary embodiment of FIG. 14, the UPS 1406 also provides power to an Ethernet hub 1410, the hub 1410 providing connectivity between the network 460 and the docked device via the Ethernet cable 1356. Consequently, the administration workstation 510 of FIG. 5 can obtain device status information, including the unique number of any device which is docked, as well as the prevailing condition of each docked device (e.g., responding, not responding, etc.). According to exemplary embodiments, the workstation 510 can query each docked device for such information, or each portable device can automatically send such information to the workstation 510 upon successful docking. Once this exchange of information is complete, software and/or data transfer between docked devices and the system 500 can proceed as described above.

Figure 15:
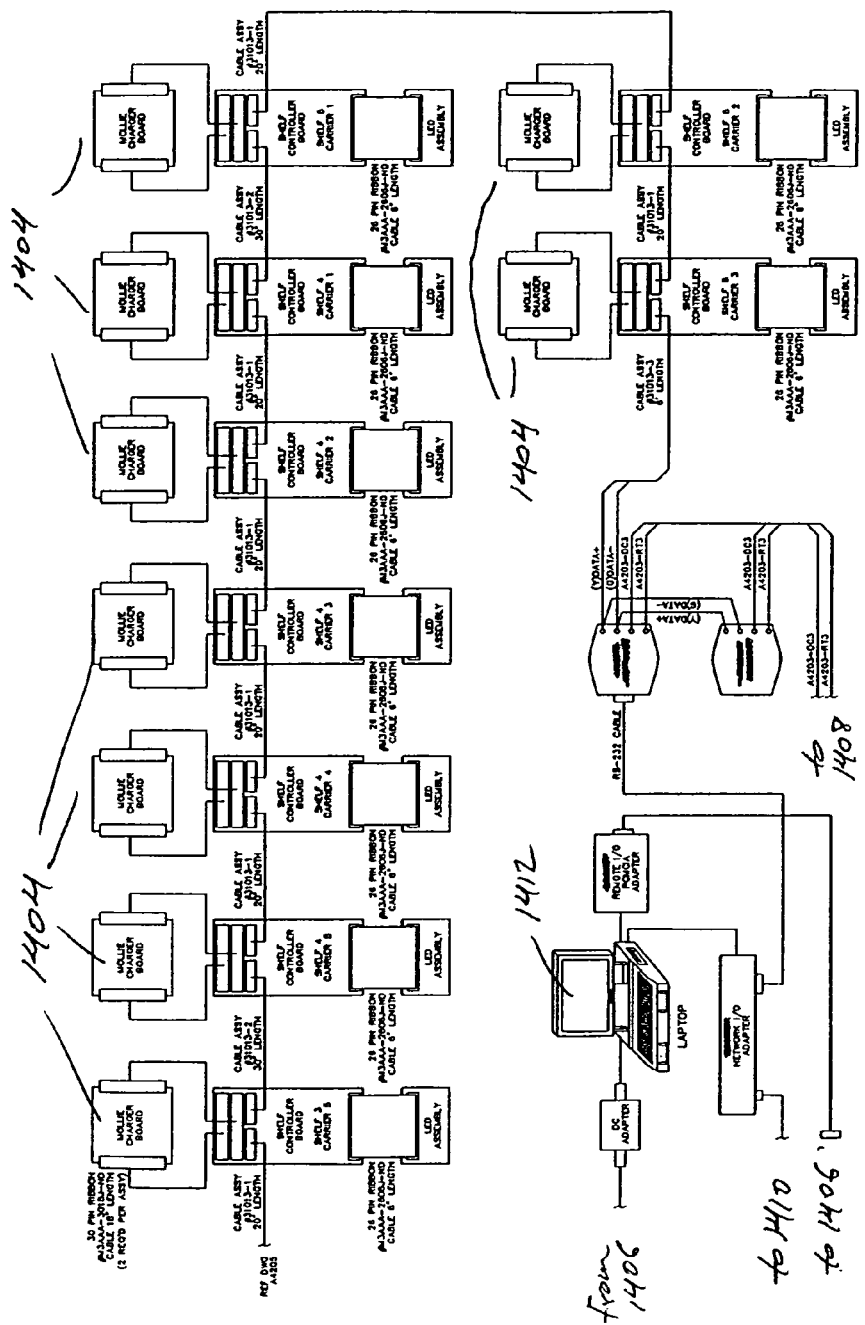
FIGS. 15 and 16 are schematics of an exemplary implementation of the configuration of FIG. 14.
Figure 16:
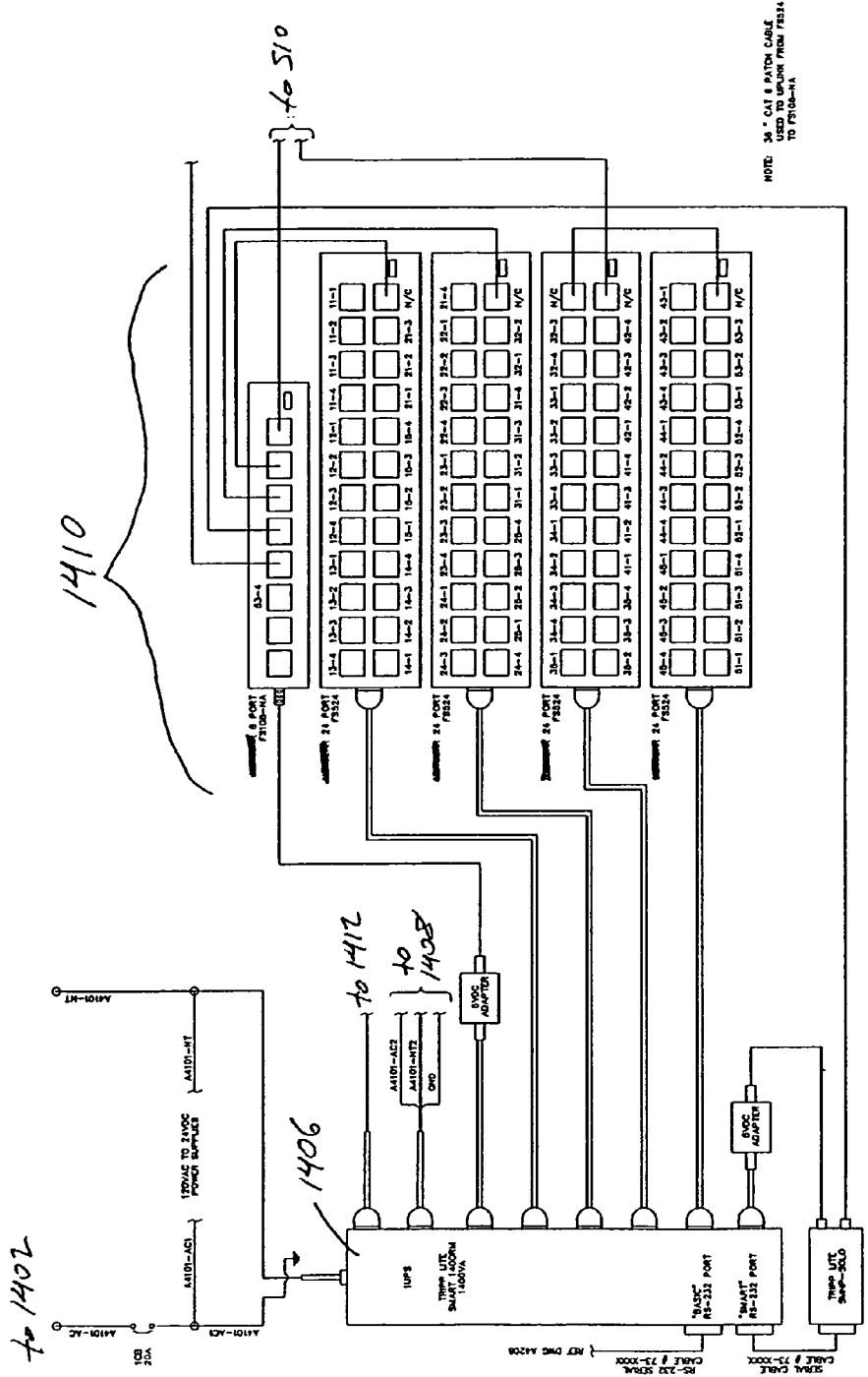

FIGS. 15 and 16 are schematics of an exemplary implementation of the embodiment of FIG. 14. Note that the battery backup provided by the UPS 1406 in the embodiments of FIGS. 14-16 gives each client unit (e.g., the control computer 1412 and the docked devices themselves) time to execute a controlled shutdown, thus preventing loss of data or other damage.

Generally, the present invention provides audio, video, text and image presentation systems that allow visitors to display facilities or other public spaces to proactively select detailed information about the various items displayed in the facilities and other spaces. Through selection and bookmark functionality, exemplary systems provide a link between the elements in the display facility or other public space and additional, more detailed information delivered off-line via the WWW or in a fixed workstation environment within the display facility or public space itself. Consequently, the invention enables a visitor to self-guide and self-tailor his or her exploration of the display facility or other public space, and further enables the visitor to extend his or her experience beyond the display facility or other public space.

Those of skill in the art will appreciate that the above described embodiments are provided by way of illustration only, and that numerous equivalent embodiments are contemplated herein. Accordingly, the scope of the invention is not limited by the foregoing description, but is defined by the appended claims, including all equivalents thereof.

What is claimed is:

1. A method for providing information about a public space element from a plurality of public space elements in a public space to a visitor after the visitor has left the public space, the method comprising:
   transmitting electronically a first signal to a portable electronic device within the public space, the first signal associated with a location of the plurality of public space elements within the public space;
   retrieving from the portable electronic device a selection menu that designates a first piece of information about the public space element from the plurality of public space elements;
   receiving, from the portable electronic device within the public space, a second signal associated with the first piece of information about the public space element from the plurality of public space elements in response to a keystroke input by the visitor;
   sending from the portable electronic device a third signal corresponding to the keystroke and a unique address associated with the visitor; and
   sending electronically a fourth signal associated with a second piece of information about the public space element from the plurality of public space elements based on the sending the third signal, the fourth signal sent to the visitor after the visitor has left the public space via a communications network extending beyond the public space in response to an electronic request from the visitor after the visitor has left the public space.

2. The method of claim 1 wherein the keystroke includes one of a bookmark and a response to a query.

3. The method of claim 1 wherein the second signal includes audio content relating to the public space element, the method further comprising:
  receiving a fifth signal associated with the first piece of information about the public space element from the plurality of public space elements in response to the keystroke input by the visitor, the fifth signal including video content,
  the first signal including a synchronization code conflaured to synchronize the receiving the second signal and the receiving the fifth signal.

4. The method of claim 3 wherein the second signal further includes text content relating to the public space element.

5. A method for supplying information about an artifact in a museum to a visitor after the visitor has left the museum, the method comprising:
  receiving a first electronic request for information about the artifact from the visitor in the museum;
  transmitting electronically a first piece of information to the visitor in the museum in response to the first electronic request, the first piece of information including an audio portion transmitted by a first electronic device and a video portion transmitted by a second electronic device;
  receiving a second electronic request for information about the artifact from the visitor in the museum;
  associating visitor identification information with said second electronic request;
  receiving an electronic inquiry from the visitor after the visitor has left the museum; and
  sending, in response to the electronic inquiry, at least one of the audio portion of the first piece of information or the video portion of the first piece of information to the visitor after the visitor has left the museum based on the second electronic request associated with the visitor identification.

6. The method of claim 5 wherein said receiving the first electronic request includes receiving a wireless electronic signal generated from the first electronic device, the first electronic device being a portable handheld device that traverses the museum with the visitor.

7. The method of claim 6 wherein said receiving the first electronic request includes receiving the wireless electronic signal over a first network having transmission capabilities limited to the museum.

8. The method of claim 7 wherein said receiving said electronic inquiry and said sending are executed over a second network different from said first network.

9. The method of claim 1, wherein the second piece of information is more detailed than the first piece of information.

10. The method of claim 1, wherein:
  the keystroke is one of a plurality of keystrokes input by the visitor; and
  the sending from the first electronic device includes sending each keystroke from the plurality of keystrokes input by the visitor.

11. The method of claim 1, wherein the sending the third signal includes docking the portable electronic device within a docking station within the public space.

12. The method of claim 1, further comprising:
  tuning a receiver within the portable electronic device in response to the first signal.

13. The method of claim 5, further comprising:
  transmitting a synchronization signal associated with a synchronization of the audio portion of the first piece of information and the video portion of the first piece of information.

14. The method of claim 5, further comprising:
  sending, in response to the electronic inquiry, a second piece of information to the visitor after the visitor has left the museum based on the second electronic request associated with the visitor identification, the second piece of information different than the first piece of information.

15. A method for providing information about an artifact in a museum to a visitor after the visitor has left the museum, the method comprising:
  receiving a first electronic signal within the museum, the first electronic signal associated with a location of a plurality of artifacts within the museum;
  receiving a keystroke from a plurality of keystrokes input by a visitor within the museum;
  transmitting, from a portable electronic device within the museum in response to the first electronic signal and the keystroke from the plurality of keystrokes, an audio signal associated with a first piece of information about an artifact from the plurality of artifacts;
  receiving, from an electronic transmitter within the museum in response to the first electronic signal and the keystroke from the plurality of keystrokes, a video signal associated with the first piece of information about the artifact from the plurality of artifacts;
  transmitting, from the portable electronic device within the museum, a second electronic signal corresponding to the keystroke and a unique address associated with the visitor; and
  transmitting at least one of the audio signal or the visual signal to the visitor after the visitor has left the museum based on the second electronic signal and in response to an electronic inquiry, via a communications network extending beyond the museum.

16. The method of claim 15, wherein the first electronic signal includes a synchronization code configured to synchronize the transmitting the audio signal associated with a first piece of information and the receiving the video signal associated with the first piece of information.

17. The method of claim 15, further comprising:
  tuning automatically a receiver within the first electronic device in response to the receiving the first electronic signal.

* * * * *